United States Patent
Herron et al.

(10) Patent No.: US 12,548,389 B1
(45) Date of Patent: Feb. 10, 2026

(54) SYSTEM AND METHOD FOR DOCUMENTATION OF VEHICLE REPAIR SERVICES

(71) Applicant: Opus IVS, Inc., Dexter, MI (US)

(72) Inventors: Brian J. Herron, Dexter, MI (US);
David M. Joseph, Ypsilanti, MI (US);
David Baartman, Canton, MI (US);
Michael D. Jurmo, Canton, MI (US)

(73) Assignee: Opus IVS, Inc., Dexter, MI (US)

( * ) Notice: Subject to any disclaimer, the term of this patent is extended or adjusted under 35 U.S.C. 154(b) by 175 days.

(21) Appl. No.: 18/491,032

(22) Filed: Oct. 20, 2023

Related U.S. Application Data

(63) Continuation-in-part of application No. 17/977,182, filed on Oct. 31, 2022, and a continuation-in-part of
(Continued)

(51) Int. Cl.
*G07C 5/08* (2006.01)
*G06F 40/205* (2020.01)
(Continued)

(52) U.S. Cl.
CPC ......... *G07C 5/0825* (2013.01); *G06F 40/205* (2020.01); *G07C 5/008* (2013.01); *G07C 5/10* (2013.01)

(58) Field of Classification Search
CPC ........ G07C 5/0825; G07C 5/008; G07C 5/10; G07C 5/0808; G07C 5/085; G07C 2205/02; G06F 40/205
See application file for complete search history.

(56) References Cited

U.S. PATENT DOCUMENTS 6,154,658 A  11/2000 Caci
6,728,603 B2  4/2004 Pruzan et al.
(Continued)

FOREIGN PATENT DOCUMENTS

WO  2004092857 A2  10/2004

OTHER PUBLICATIONS

Article entitled "Remote Vehicle Diagnostic System Using Mobile Handsets" by Doo-Hee Jung, Gu-Min Jeong, and Hyun-Sik Ahn, understood to be from the proceedings of the Jun. 2006 International Conference on Wireless Networks, ICWN 2006, Las Vegas, Nevada.
(Continued)

*Primary Examiner* — James J Lee
*Assistant Examiner* — Alexander George Matta
(74) *Attorney, Agent, or Firm* — Gardner, Linn, Burkhart & Ondersma LLP

(57) ABSTRACT

A system and method includes connecting an interface device to a port of a vehicle to be in communication with an electrical system of the vehicle for monitoring the vehicle, and running a selected one of multiple available calibration and/or repair programs via the interface device to generate a calibration/repair data file of the vehicle, where the data/log file is generated in one of a plurality of possible native file formats. A report generation tool acquires screen captures and/or screen recordings to document the data/information displayed during the steps of a calibration/repair procedure. An evaluation tool extracts calibration/repair data from the data/log file, where the evaluation tool is configured to extract calibration/repair diagnostic data from data/log files in each of the plurality of possible native file formats, and outputs the calibration/repair diagnostic data to a database in a common format from which detailed calibration/repair diagnostic reports are generated.

20 Claims, 19 Drawing Sheets

Related U.S. Application Data application No. 16/552,568, filed on Aug. 27, 2019, now Pat. No. 11,861,954.

(51) Int. Cl.
*G07C 5/00* (2006.01)
*G07C 5/10* (2006.01)

(56) References Cited

U.S. PATENT DOCUMENTS

| | | |
|---|---|---|
| 6,879,894 B1 | 4/2005 | Lightner et al. |
| 6,956,501 B2 | 10/2005 | Kitson |
| 7,092,803 B2 | 8/2006 | Kapolka et al. |
| 7,373,226 B1 | 5/2008 | Cancilla et al. |
| 7,502,672 B1 | 3/2009 | Kolls |
| 7,519,458 B2 | 4/2009 | Buckley |
| 7,532,962 B1 | 5/2009 | Lowrey et al. |
| 7,584,030 B1 | 9/2009 | Graham |
| 7,786,851 B2 | 8/2010 | Drew et al. |
| 7,840,812 B1 | 11/2010 | Levenberg |
| 7,928,837 B2 | 4/2011 | Drew et al. |
| 8,190,322 B2 | 5/2012 | Lin et al. |
| 8,259,936 B2 | 9/2012 | Mahalingaiah |
| 8,306,687 B2 | 11/2012 | Chen |
| 8,339,254 B2 | 12/2012 | Drew et al. |
| 8,352,577 B2 | 1/2013 | Martone |
| 8,638,207 B2 | 1/2014 | Drew et al. |
| 8,688,313 B2 | 4/2014 | Margol et al. |
| 8,909,416 B2 | 12/2014 | Chen et al. |
| 8,918,245 B2 | 12/2014 | Dewhurst et al. |
| 9,430,884 B2 | 8/2016 | Drew et al. |
| 9,530,255 B2 | 12/2016 | Drew et al. |
| 9,563,988 B2 | 2/2017 | Drew et al. |
| 9,646,130 B2 | 5/2017 | Drew et al. |
| 10,013,816 B2 | 7/2018 | Nassar et al. |
| 10,146,521 B2 | 12/2018 | West et al. |
| 10,181,225 B2 | 1/2019 | Liebl et al. |
| 10,282,924 B2 | 5/2019 | Drew et al. |
| 10,414,277 B1 | 9/2019 | Herron et al. |
| 10,445,953 B1 | 10/2019 | Herron et al. |
| 10,706,645 B1 | 7/2020 | Herron et al. |
| 10,719,813 B1 | 7/2020 | Beckmann et al. |
| 10,748,356 B1 | 8/2020 | Herron et al. |
| 11,062,534 B2 | 7/2021 | Jingle et al. |
| 2001/0056544 A1 | 12/2001 | Walker |
| 2003/0001720 A1 | 1/2003 | Wade et al. |
| 2003/0020759 A1 | 1/2003 | Cancilla et al. |
| 2004/0044454 A1 | 3/2004 | Ross et al. |
| 2004/0167689 A1 | 8/2004 | Bromley et al. |
| 2005/0021294 A1 | 1/2005 | Trsar et al. |
| 2005/0038581 A1 | 2/2005 | Kapolka et al. |
| 2005/0060070 A1 | 3/2005 | Kapolka et al. |
| 2005/0182537 A1 | 8/2005 | Tefft et al. |
| 2005/0240555 A1 | 10/2005 | Wilde et al. |
| 2005/0251304 A1 | 11/2005 | Cancellara et al. |
| 2006/0052921 A1 | 3/2006 | Bodin et al. |
| 2006/0106508 A1* | 5/2006 | Liebl ............... G07C 5/008 701/31.4 |
| 2006/0211446 A1 | 9/2006 | Wittmann et al. |
| 2006/0243788 A1 | 11/2006 | Waco |
| 2007/0005201 A1 | 1/2007 | Chenn |
| 2007/0043488 A1 | 2/2007 | Avery et al. |
| 2007/0050105 A1 | 3/2007 | Chinnadurai et al. |
| 2007/0055420 A1 | 3/2007 | Krzystofczyk et al. |
| 2007/0073460 A1 | 3/2007 | Bertosa et al. |
| 2007/0185624 A1 | 8/2007 | Duddles et al. |
| 2007/0204215 A1* | 8/2007 | Mueller ............ G06F 30/00 707/999.102 |
| 2007/0233340 A1 | 10/2007 | Raichle et al. |
| 2008/0177438 A1 | 7/2008 | Chen et al. |
| 2008/0269975 A1 | 10/2008 | Bertosa |
| 2008/0280602 A1 | 11/2008 | Ban |
| 2008/0306645 A1* | 12/2008 | Dewhurst ............ G07C 5/008 701/31.4 |
| 2009/0006476 A1 | 1/2009 | Andreasen et al. |
| 2009/0062978 A1 | 3/2009 | Picard |
| 2009/0118899 A1 | 5/2009 | Carlson |
| 2009/0119657 A1 | 5/2009 | Link, II |
| 2009/0187976 A1 | 7/2009 | Perroud et al. |
| 2009/0265055 A1 | 10/2009 | Gillies |
| 2009/0276115 A1 | 11/2009 | Chen |
| 2010/0042287 A1 | 2/2010 | Zhang |
| 2010/0174446 A1 | 7/2010 | Andreasen et al. |
| 2010/0204878 A1 | 8/2010 | Drew et al. |
| 2010/0205450 A1* | 8/2010 | Sarnacke ............ B60R 25/00 713/185 |
| 2010/0262335 A1 | 10/2010 | Brozovich |
| 2011/0054730 A1* | 3/2011 | Knight ............... G07C 5/008 701/29.5 |
| 2011/0071709 A1 | 3/2011 | Damiani et al. |
| 2011/0112718 A1 | 5/2011 | Claus et al. |
| 2011/0153150 A1 | 6/2011 | Drew et al. |
| 2011/0276218 A1 | 11/2011 | Dwan |
| 2011/0313593 A1 | 12/2011 | Cohen et al. |
| 2012/0046826 A1 | 2/2012 | Panko |
| 2012/0254345 A1 | 10/2012 | Montoya |
| 2013/0304306 A1* | 11/2013 | Selkirk ............... G07C 5/0808 701/31.4 |
| 2014/0279230 A1 | 9/2014 | Bertosa et al. |
| 2015/0121275 A1 | 4/2015 | Marshall et al. |
| 2017/0069146 A1* | 3/2017 | Sun .................. G07C 5/0808 |
| 2017/0301154 A1 | 10/2017 | Rozint |
| 2019/0258727 A1 | 8/2019 | Schmotzer et al. |
| 2019/0311558 A1 | 10/2019 | Bika et al. |

OTHER PUBLICATIONS

Thesis by Alexander Ellery, entitled, "Systems Design & Control of a Freeflying Space Robotic Manipulation System (ATLAS) for In-Orbit Satellite Servicing Operations", Published 1996, Cranfield University, College of Aeronautics.

\* cited by examiner

SYSTEM AND METHOD FOR DOCUMENTATION OF VEHICLE REPAIR SERVICES

CROSS REFERENCE TO RELATED APPLICATIONS

The present application is a continuation-in-part of U.S. patent application Ser. No. 16/552,568, filed Aug. 27, 2019, and Ser. No. 17/977,182, filed Oct. 31, 2022, which are both hereby incorporated by reference herein in their entireties.

FIELD OF THE INVENTION

The present invention is directed to a vehicle service system and method, and in particular a system and method for obtaining and reporting selected vehicle service and diagnostic data information from a vehicle service procedure and diagnostic evaluation for various vehicle manufacturers.

BACKGROUND OF THE INVENTION

Vehicle diagnostic systems employing diagnostic scan devices or tools are used in automotive repair facilities to diagnose and repair computer-based vehicle systems, where vehicles may have differing computer-based systems depending on the configuration and options installed on the vehicle. Vehicle diagnostic scan systems may include or use one or more diagnostic software scanning programs or applications, such as applications developed by an original equipment automotive manufacturer ("OEM"), or an aftermarket diagnostic company. The diagnostic software scanning programs are used to diagnose the electronic system of a vehicle and result in a scan log file that includes information of faults in the system. The returned scan log files from the diagnostic software scanning program are in differing native file formats and include different content and arrangements depending on the supplier of the diagnostic software scanning program, as well as the vehicle application for which the scanning program is used.

SUMMARY OF THE INVENTION

The present invention provides a system and method for generating vehicle service reports providing confirmation and proof that a vehicle service was performed pursuant to specified operations, including by screenshots and/or screen recordings during service that may be captured automatically during the service procedure and may be collated along with additional data in a report, such as may be provided to an insurer to confirm that the service was performed properly. During a service procedure, the system operates to systematically read diagnostic application scan log files and calibration and/or repair data/log files regardless of the native file format and transfer selected diagnostic data information (from the respective scan, calibration, and/or repairs) from the scan log file or the calibration/repair data/log files into a scan or calibration/repair database from which reports regarding vehicle diagnostic evaluations may be readily run, where the scan, calibration, and/or repair diagnostic data provided to the scan or calibration/repair database may be compiled into a common format. At each step of a calibration or repair procedure (or at particular points during a diagnostic scan), screen captures and/or screen recordings will be either automatically captured or a technician will be prompted to perform the screen capture or screen recording.

In an embodiment of the present invention, an exemplary vehicle diagnostic system includes a computer device, a vehicle interface device, and a diagnostic evaluation tool program. The computer device includes a plurality of calibration and/or repair application programs with the calibration and/or repair application programs configured for selective use with vehicles to monitor electronic systems of the vehicles using the vehicle interface device interfacing with the computer device and the vehicle (during the calibration and/or repair procedure). Each calibration and/or repair application program is configured for use with particular vehicles based on the make and model of the vehicles and the calibration and/or repair procedure to be performed. The calibration and/or repair application programs return calibration/repair data/log files and the calibration/repair data/log files are provided in different native file formats depending on the selected calibration and/or repair application program used for a given vehicle and a given calibration or repair procedure. The diagnostic evaluation tool program is configured for extracting particular predefined selected portions of calibration and/or repair diagnostic data from each calibration/repair data/log file regardless of the native file format of the calibration/repair data/log files. The diagnostic evaluation tool program outputs the particular predefined extracted selected portions of calibration and/or repair diagnostic data in a common format to a calibration/repair database. The particular predefined extracted selected portions of calibration and/or repair diagnostic data are retained in the calibration/repair database.

According to an aspect of the present invention, a method of diagnosing a vehicle includes connecting a vehicle interface device to a diagnostic port of a vehicle to be in communication with an electrical system of the vehicle for diagnosing the vehicle, and running a selected one of multiple available diagnostic application scan programs via the vehicle interface device to generate a scan log file of the electrical system of the vehicle, where the scan log file is generated in one of a plurality of possible native file formats depending on the selected diagnostic application program. The method further includes using a diagnostic evaluation tool program to extract diagnostic data from the scan log file, where the diagnostic evaluation tool program is configured to extract diagnostic data from scan log files in each of the plurality of possible native file formats.

The diagnostic evaluation tool program operates to extract diagnostic data from the scan log file comprises by translating the native file format of the scan log file and parsing the scan log file to secure selected information. In particular embodiments the selected information may comprise a Diagnostic Trouble Code ("DTC"), a description of the DTC, and the native file formats may comprise text in portable document format ("PDF"), PDF images, and Hypertext Markup Language ("HTML"), where the diagnostic evaluation tool program may translate the native file format into HTML.

The method in further embodiments additionally comprises outputting and saving the diagnostic data to a scan database, as well as generating a diagnostic detail report from the diagnostic data using the scan database. Still further, the extracted diagnostic data may be transmitted to a remote computer.

According to a further aspect of the present invention, a vehicle diagnostic system includes a computer device having multiple diagnostic application scan programs that are configured for selective use with vehicles to perform a scan of electronic systems of the vehicles using a vehicle interface device interfacing with the computer device and the vehicle. Each diagnostic application scan program is configured for use with particular vehicles and return scan log files that are provided in different native file formats depending on the selected diagnostic application scan program used for a given vehicle. The vehicle diagnostic system further includes a diagnostic evaluation tool program configured for extracting diagnostic data from each scan log file regardless of the native file format of the scan log files, with the diagnostic evaluation tool program storing the extracted diagnostic data to a scan database.

The vehicle diagnostic system and method enables diagnostic detail reports to be readily produced that include particular relevant information, where the reports may be generated regardless of the disparate data in disparate formats from scan log files. This enables users of the systems, such as repair facility operators, to quickly and efficiently provide relevant information to their customers, such as reports indicating diagnostic faults in the electrical system of the vehicle and recommended courses for repair. These and other objects, advantages, purposes and features of this invention will become apparent upon review of the following specification in conjunction with the drawings.

In an aspect of the present invention, the computer device and/or the vehicle interface device are configured to perform screen captures and/or screen recordings of a display screen displaying procedural data. The screen captures and/or screen recordings are performed automatically or in response to a prompt by a user. The captured procedural data displayed on the display screen provides documentation of the procedural step data. The computer device and/or the vehicle interface device are configured to store any captured screen captures and/or screen recordings for each procedural step into a database for later retrieval.

In a further aspect of the present invention, the computer device is operable to generate a scan, calibration, and/or repair diagnostic detail report from associated scan, calibration, and/or repair diagnostic data, and for each procedural and/or repair procedural step, to extract related screen captures and/or screen recordings from the database to provide documentation of results of the procedural and/or repair step.

DESCRIPTION OF THE PREFERRED EMBODIMENTS

The present invention will now be described with reference to the accompanying figures, wherein the numbered elements in the following written description correspond to like-numbered elements in the figures.

Figure 1:
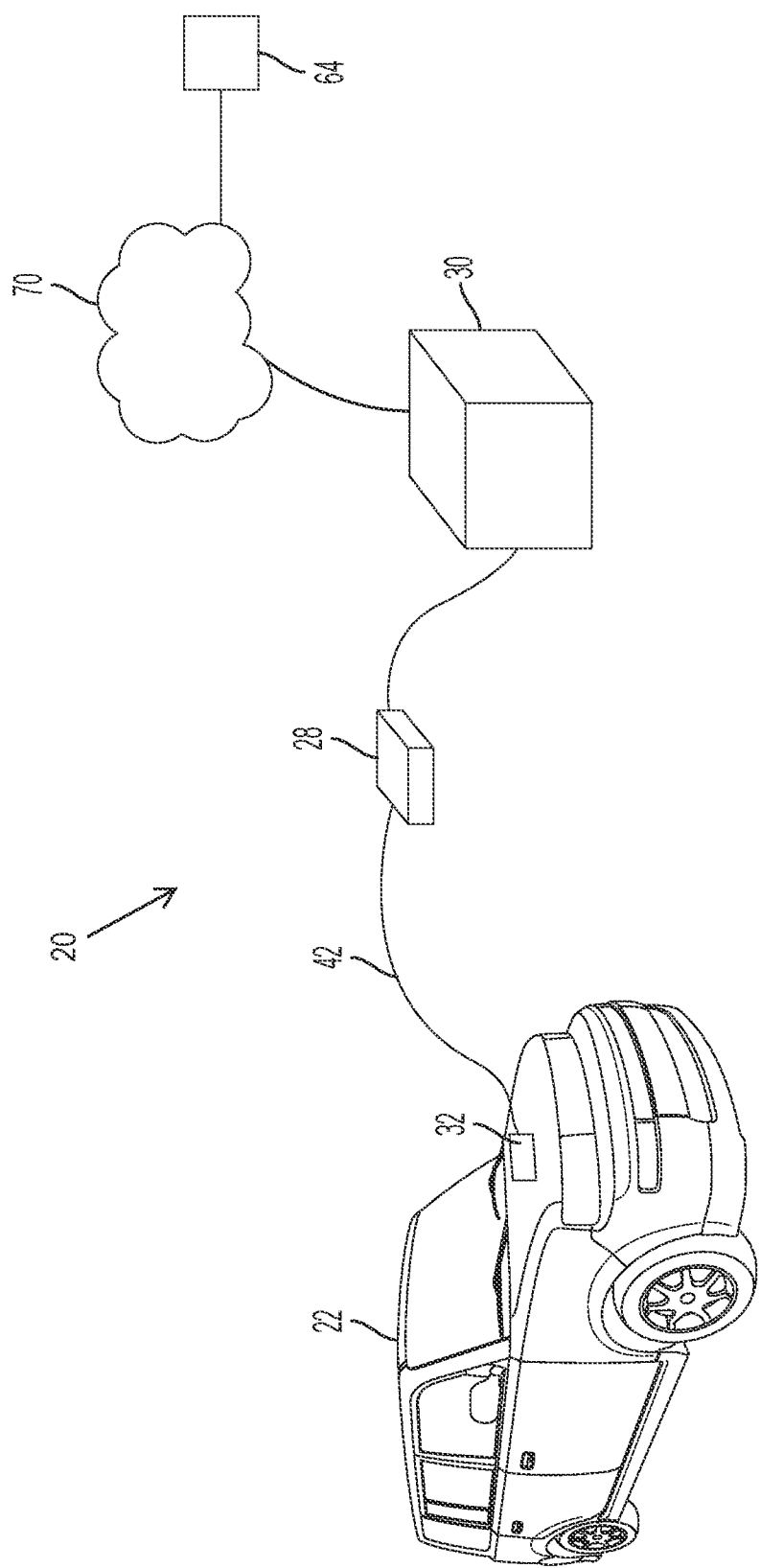
FIG. 1 is a schematic illustration of a vehicle diagnostic system in accordance with the present invention in use with a vehicle.
Figure 2:
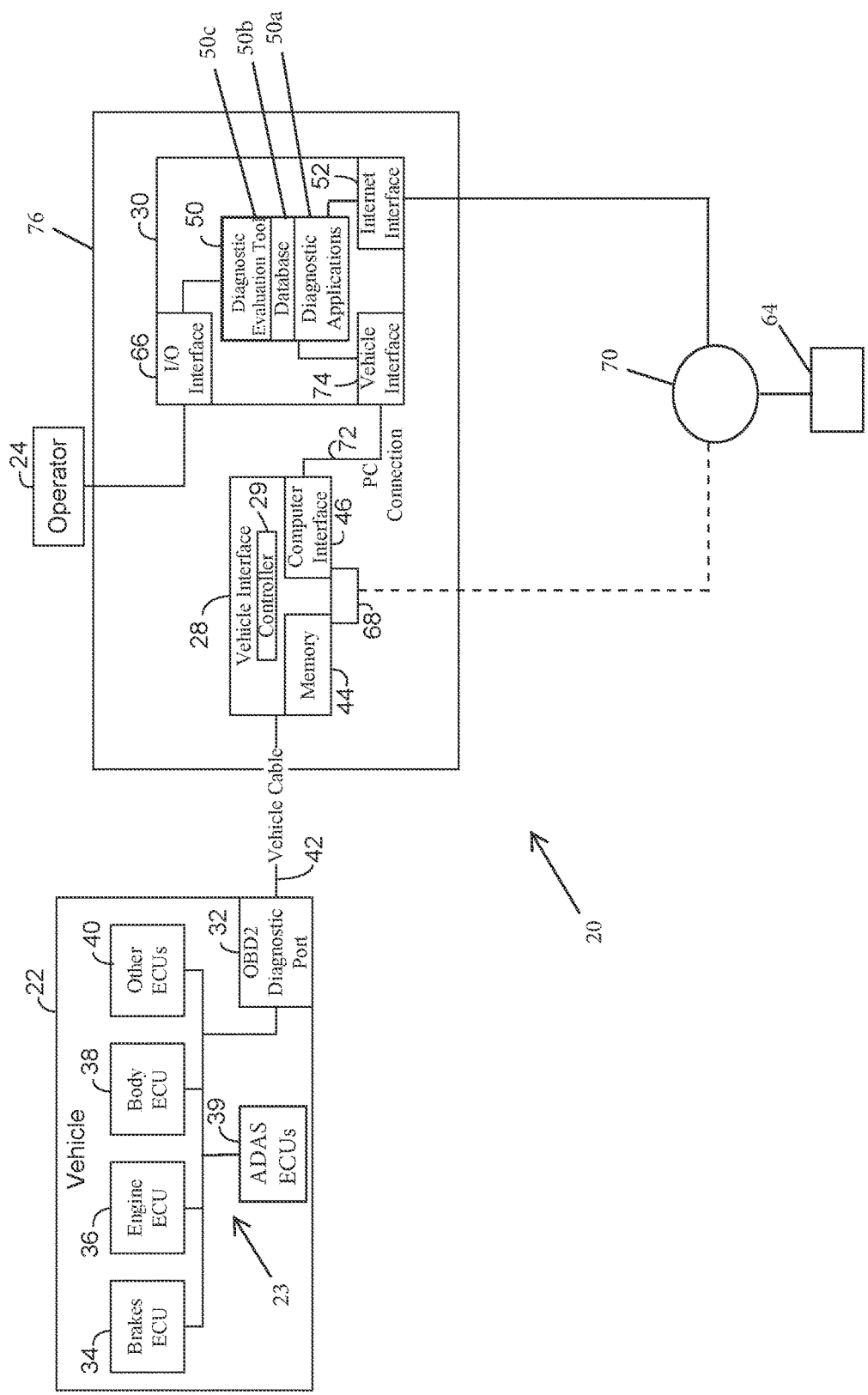
FIG. 2 is a detailed block diagram of the vehicle diagnostic system of FIG. 1.

With reference to FIGS. 1 and 2, a vehicle diagnostic system 20 for use with a vehicle 22 is shown for use by a mechanic or operator 24, such as in an automotive repair facility. System 20 is illustrated as including a vehicle diagnostic tool, referred to as a vehicle interface device or interface tool 28 that is communicatively coupled to a local computer 30. In use, vehicle interface device 28 is connected with vehicle 22 by operator 24, such as by connecting to an on-board diagnostic ("OBD") diagnostic port 32 of the vehicle 22 in order to diagnose the electronic system 23 of vehicle 22, including to diagnose various vehicle electronic control units (ECUs), such as an engine ECU 34, body ECU 36, brakes ECU 38, ADAS ECUs 39, and/or other ECUs 40, and/or other electronic parts and components of vehicle 22. Vehicle interface device 28 connects with port 32, such as via vehicle cable 42. Vehicle interface device 28 includes a controller 29, such as in the form of a processor or microprocessor and interface circuitry to facilitate communication between the ECUs and the interface tool 28, with interface tool 28 including a database of vehicle protocols found in a local memory 44 that allow communication with the ECUs of various makes and models of vehicles. Vehicle interface device 28 additionally includes a computer interface 46 for connection with computer 30, such as via standard interfaces 74, such as USB, Bluetooth, Wi-Fi, or the like. As understood from FIGS. 1 and 2, one or both of vehicle interface device 28 and local computer 30 may be connected to a remote computer, such as a server 64, such as by an Internet 70 connection. Vehicle diagnostic system 20 may be configured to be selectively operable in one of a plurality of different modes, whereby a technician may use the interface device 28 for vehicle maintenance, diagnosis, programming and repair as needed.

Figure 3:
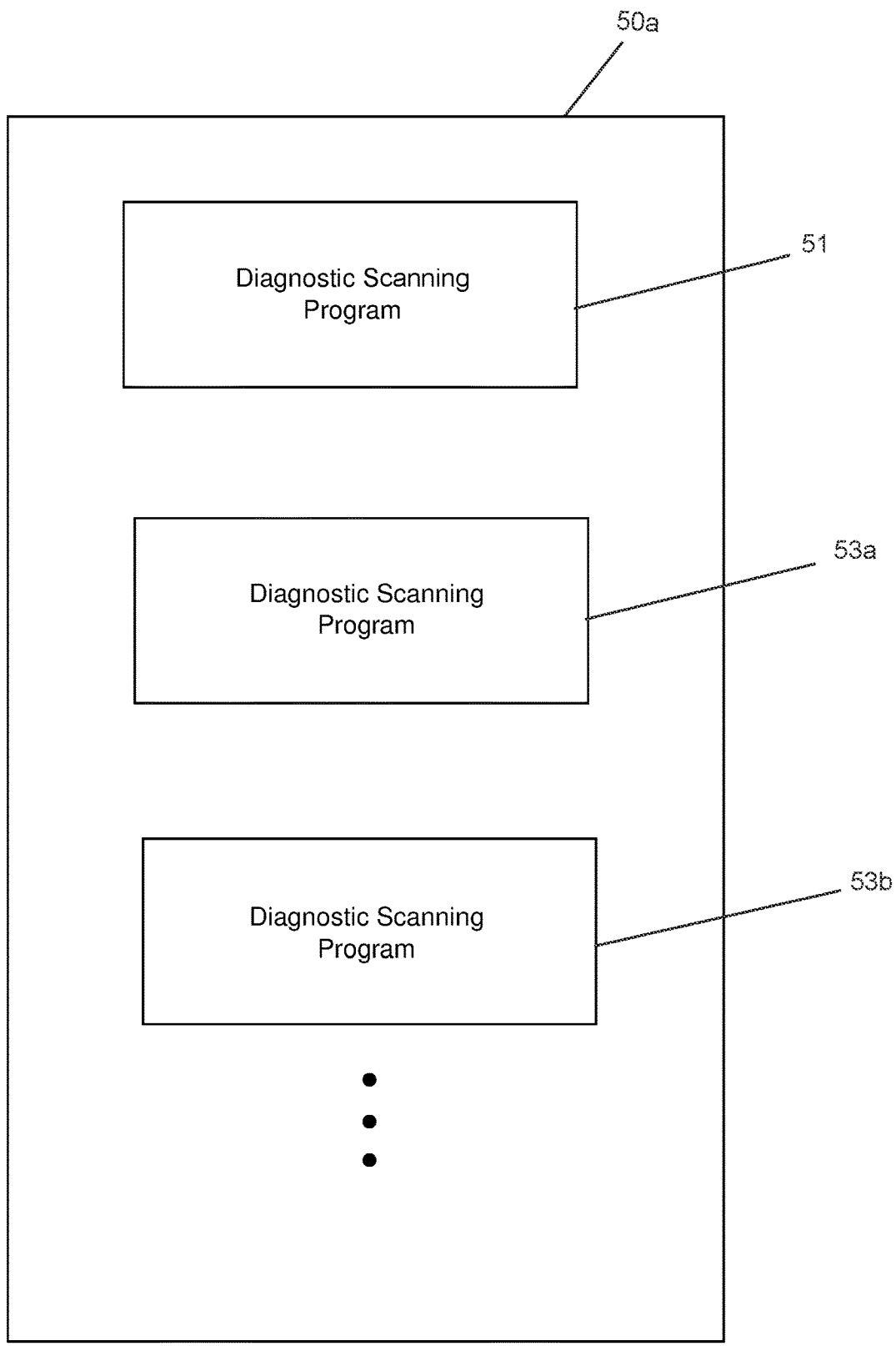
FIG. 3 is a block diagram of diagnostic applications of the vehicle diagnostic system of FIG. 2.
Figure 4:
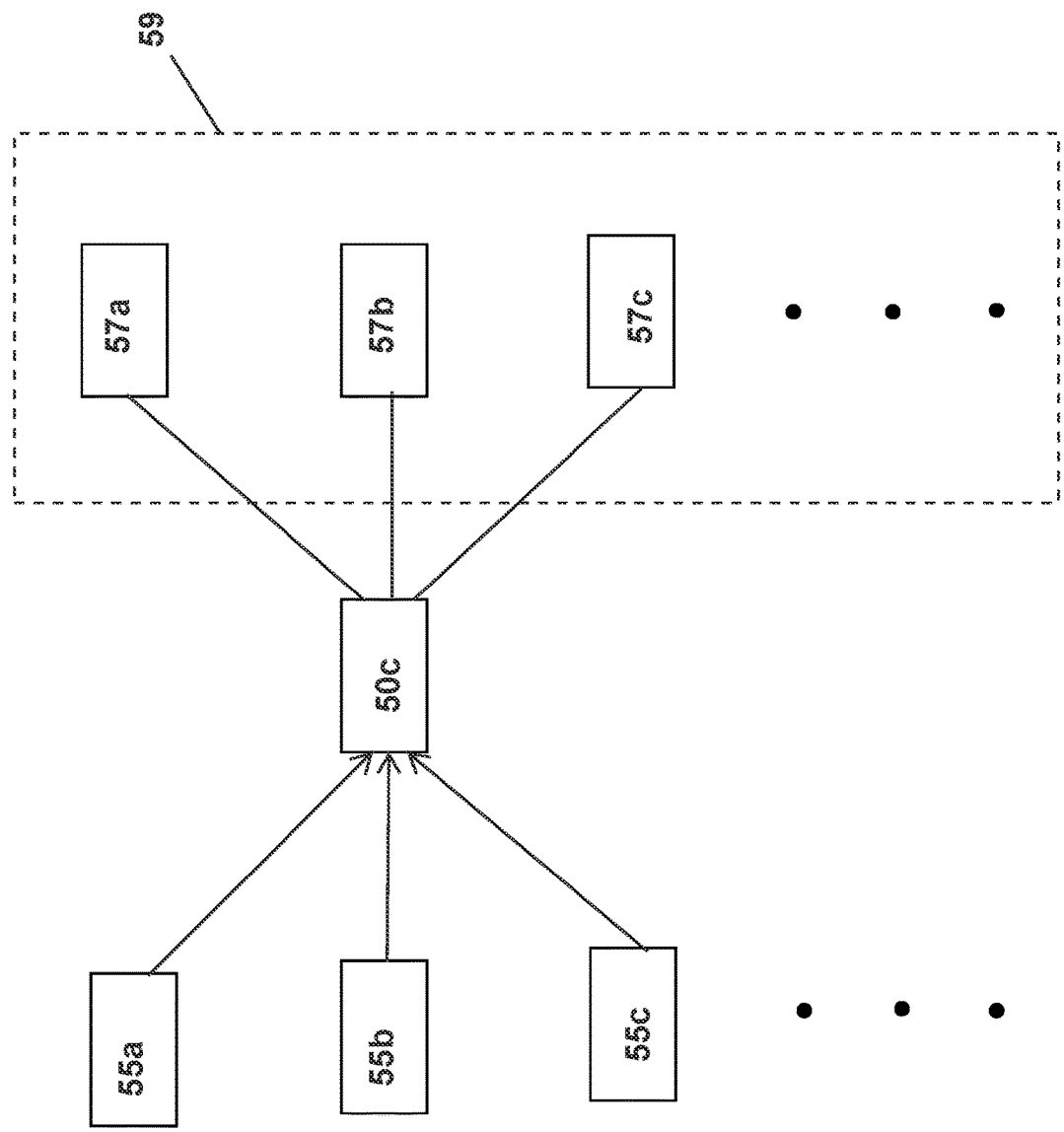
FIG. 4 is a schematic illustration of the use of a diagnostic evaluation tool with scan log files in accordance with the present invention.
Figure 5:
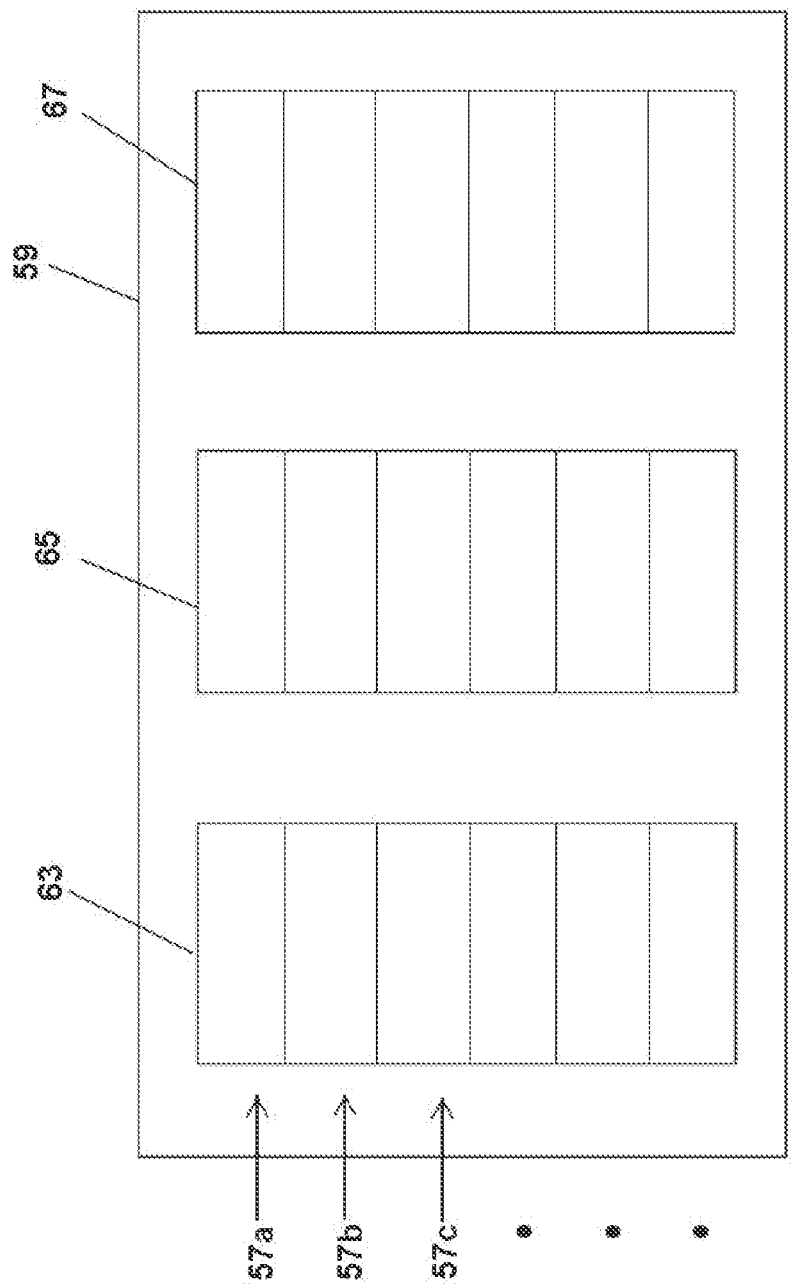
FIG. 5 is a block diagram of a database storing diagnostic data obtained from the use of a diagnostic evaluation tool in accordance with the present invention.
Figure 6:
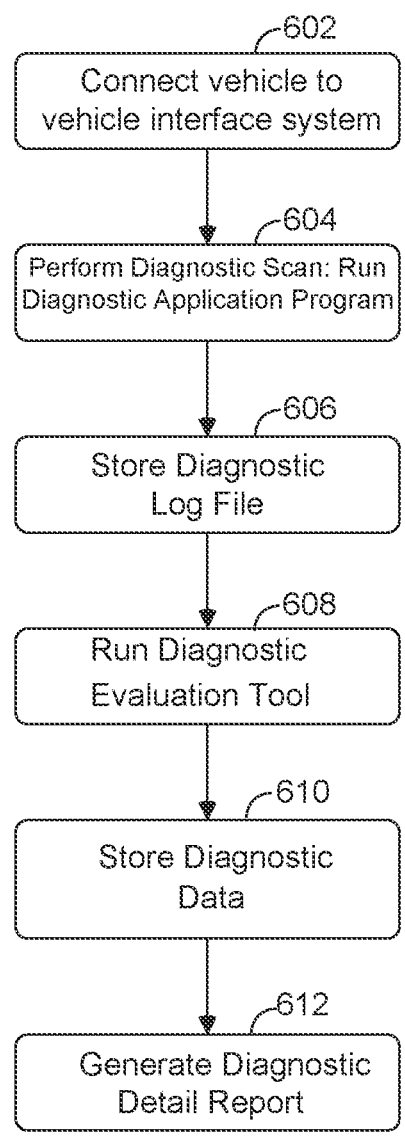
FIG. 6 is a flow diagram of a method for generating a diagnostic detail report in accordance with the present invention.

In accordance with an embodiment of the present invention, system 20 includes diagnostic applications or diagnostic application scanning tools 50*a* for scanning the electronic system 23 of vehicle 22 with a diagnostic application scanning program, such as one or more different diagnostic application scanning programs 53*a*, 53*b*, 53*c* (FIG. 3) stored in memory 50 of local computer 30, where a given scanning program is run depending on, for example, the make and model of vehicle. Scans performed by or with the diagnostic application programs 53*a*, 53*b*, 53*c* result in the generation and acquisition of data reports or scan log files for each tested vehicle, such as scan log files 55*a*, 55*b*, 55*c* (FIG. 4), that may also be stored in memory 50 of local computer 30. The diagnostic application programs 53*a*, 53*b*, 53*c* may be provided from different entities, including for example different original equipment manufacturers (OEMs), with the log files 55*a*, 55*b*, 55*c* generated by system 20 differing based on the particular vehicle under test, as well as the diagnostic application program used, including with regard to file format and/or content. System 20 thus additionally includes a diagnostic evaluation tool 50*c* that is operable to process the scan log files regardless of file format to obtain selected diagnostic data, such as diagnostic data 57*a*, 57*b*, 57*c* (FIG. 4), from each scan log file and output the diagnostic data in a uniform format to a scan database 59 (FIGS. 4 and 5) from which a user is able to generate a detail diagnostic report 61 (FIG. 6). The diagnostic report thus comprises selected information from each of the scan log files whereby the information is readily consolidated in a common format and file type. Still further, diagnostic evaluation tool 50*c* may be used to transmit the diagnostic detail reports such as via an Internet for remote review and use.

In the illustrated embodiment computer 30 is operatively connected with vehicle interface device 28, with computer 30 including one or more commercially available diagnostic application scanning programs 53*a*, 53*b*, 53*c* (FIG. 3), where the scanning programs may be configured for use with different variations of vehicles, such as by make, model, model year and/or vehicle systems or options. Accordingly, a particular diagnostic application scanning program 53*a*, 53*b*, 53*c* will be selected for use depending on the specific vehicle 22 being diagnosed. Although shown as only including three diagnostic application programs 53*a*, 53*b*, 53*c*, it should be appreciated that system 20 may include fewer than three or more than three such programs that are available for use with various vehicles. For example, a general service repair facility may service vehicles manufactured by a wide range of OEMs, including a wide range of models and model years of vehicles, and thus utilize numerous diagnostic application programs. Interface device 28 may be configured as an SAE standard J2534 device, such as a device compliant with the J2534-2 standard, or as an ISO compliant or other standard compliant device for supporting and enabling communication with the electronic systems 23 of a vehicle 22.

As illustrated in FIG. 2, the diagnostic application scanning programs 53*a*, 53*b*, 53*c* are stored in a memory 50, where the diagnostic application scanning tool is configured to enable the reading and reporting of fault codes in the electronic system of the vehicle such as may be located in ECUs of the vehicle. An exemplary diagnostic application scanning program comprises a program provided by an automotive OEM, such as General Motors ("GM"), Ford, FCA ("Fiat Chrysler Automobiles" or "Chrysler"), Bayerische Motoren Werke ("BMW"), Honda, Nissan, Toyota, Mercedes or the like. Alternatively, a diagnostic application scanning program may be provided by a company that supplies diagnostic application programs, such as Snap-On Incorporated. In practice, as noted, memory 50 may include multiple diagnostic application programs, each for use with various makes and/or models of vehicles to enable diagnosing and programming of ECUs via vehicle interface device 28, including depending on the particular vehicle systems/ECUs on the vehicle installed by the OEM based on the customer's selection of vehicle options. Vehicle interface device 28 and computer 30 are thus cooperatively used for querying/scanning and diagnosing ECUs of vehicle 22, including for accessing error codes generated by the ECUs for assessing and diagnosing operational and performance related aspects of the vehicle 22.

It should be appreciated that diagnostic application scanning programs 53*a*, 53*b*, 53*c* are provided in various computer software formats, configurations and/or languages, including for example, depending on the supplier of the diagnostic application scanning program, such as depending on the OEM. As is known by those skilled in the art, each OEM provides their own unique scanning programs. For example, the below table identifies selected OEMs and their associated scanning software program applications:

| OEM | OEM Software Application |
|---|---|
| BMW | ISTA |
| Chrysler | Witech 2.0 |
| Ford | IDS/FRDS |
| GM | GDS 2/Tech2Win |
| Honda | HDS/iHDS |
| Hyundai | GDS/KDS |
| Nissan | Consult 3+ |
| Toyota | Techstream |

Upon running a given diagnostic scanning application program 53*a*, 53*b*, 53*c* via vehicle interface 28, vehicle interface 28 returns a scan log file 55*a*, 55*b*, 55*c* reporting the status of the electronic system 23 of vehicle 22, with the associated scan log file 55*a*, 55*b*, 55*c* being stored in memory 50. Although shown to include three scan log files 55*a*, 55*b*, 55*c*, it should be appreciated that a separate scan log file will exist for each vehicle that has been diagnosed via system 20. Moreover, corresponding to the differences in the various computer software formats for the diagnostic scanning application program 53*a*, 53*b*, 53*c* depending on the diagnosed vehicle, the returned scan log files 55*a*, 55*b*, 55*c* are correspondingly provided in various native file formats depending on the diagnostic scanning application program 53*a*, 53*b*, 53*c* used to perform the diagnostic scan of the vehicle 22. These scan log native file formats include, for example, text in portable document format ("PDF"), PDF images, and Hypertext Markup Language ("HTML"), as well as may be provided or stored in various formats, including as a compressed file, such as a PKzip or ZIP file.

It should be appreciated that in a repair facility numerous scan procedures may be performed, including across a wide variety of vehicles based on make, model and/or model year. Difficulties therefore occur in accessing and processing the information provided by the scan log files due to their differing file formats and content. Accordingly, as illustrated and understood from FIG. 4, system 20 utilizes diagnostic evaluation tool 50c on the collected scan log files, such as files 55a, 55b, 55c, to extract and provide relevant desired diagnostic data 57a, 57b, 57c to a scan database 59 in a common format. In particular, diagnostic evaluation tool 50c systematically reads the scan log files, or skims the results off a screen view, and places selected diagnostic data 57a, 57b, 57c in the form of text into scan database 59. Although shown as having obtained and generated diagnostic data 57a, 57b, 57c, it should be appreciated that system 20 may obtain and generate diagnostic data for each scan log file obtained via diagnostic evaluation tool 50c, with the diagnostic data being stored in the scan database 59. From scan database 59, one or more detail diagnostic reports 61 may be generated, such as to evaluate diagnostic reports for a selected make of vehicle, or make and model of vehicle, or based on vehicle features, or over a selected time period.

In a particular embodiment, detail diagnostic reports 61 may be generated for individual customer vehicles at a repair facility. In this way, a common report format may be readily generated for use by a mechanic 24 when diagnosing and presenting information to the customer regarding their vehicle, with the report automatically including diagnostic data information from the scan log file without the mechanic 24 or another individual having to manually review the scan log file and enter information into a report for the customer. In particular, the detail diagnostic report 61 is created regardless of make and model of vehicle, and specifically regardless of the diagnostic scanning application program 53a, 53b, 53c used to scan the customer's vehicle, and correspondingly regardless of the native file format of the scan log file 55a, 55b, 55c returned from the diagnostic scanning application program.

Diagnostic evaluation tool 50c may be further or alternatively used to transmit or upload the diagnostic data 57a, 57b, 57c to a cloud portal, such as at 64, whereat a database of the diagnostic data may be retained.

In the illustrated embodiment, diagnostic evaluation tool 50c comprises an application program operating within local computer 30. In use, diagnostic evaluation tool 50c operates to open and read the scan log files obtained by system 20, such as files 55a, 55b, 55c, with tool 50c operatively automatically detecting or recognizing the native format of the scan log files. This may include, for example, tool 50c detecting or triggering based on output files or content obtained from running of a given diagnostic scanning application program 53a, 53b, 53c. Diagnostic evaluation tool 50c additionally reads and translates the scan log file data into a desired format, where necessary. In the illustrated embodiment, for example, diagnostic evaluation tool 50c translates the scan log file information into HTML format. Various .NET modules may be used for translating and parsing of the scan log files. For example, PDF image files may be translated and parsed using IronOcr software supplied by Iron Software LLC of Chicago, Illinois, such as IronOCR v4.4.0; PDF text files may be translated and parsed using iText software supplied by iText Group nv of Belgium, such as iText7 v7.1.2; and HTML native files may be parsed using Html Agility Pack ("HAP") provided by ZZZ Projects.

It should be appreciated that alternative programs may be employed for opening, reading, translating and/or parsing the scan log files, and should be further appreciated that a diagnostic evaluation tool in accordance with the present invention may comprise multiple modules cooperatively working together. Still further, and as noted above, diagnostic evaluation tool 50c may alternatively be employed to extract or pull desired diagnostic data information by way of skimming selected data from a screen view of the scan log file.

As noted, diagnostic evaluation tool 50c extracts or pulls selected information from scan log files 55a, 55b, 55c for placement in scan database 59. For each of the scan log files in the illustrated embodiment, as understood from FIG. 6, diagnostic evaluation tool 50c pulls from the scan log file the Diagnostic Trouble Code ("DTC") 63 for a given fault, the description 65 of the fault, and the fault state 67, with that information then stored in a common format within scan database 59. As understood by a person of skill in the art, the fault state 67 indicates whether the given fault is a historic fault code that occurred in the past and may have been cleared or repaired, an active fault code, or a key cycle fault code having just occurred. It should be appreciated that scan database 59 additionally includes information regarding the make and model of vehicle, the VIN and other identifying information.

Database 59 thus allows diagnostic detail reports 61 to be readily generated. For example, in a repair facility a mechanic 24 may generate a report 61 for a customer specific to the customer's vehicle providing details regarding the vehicle and incorporating information form the scan log file as stored in database 59. Additionally or alternatively, reports may be run to evaluate a given make and model, including such as over time to assess fault history.

A method of generating diagnostic detail reports 61 in accordance with aspects of the present invention as described above is disclosed with reference to FIG. 6. As there shown, in step 202 a vehicle 22 to be evaluated is communicatively coupled to a vehicle interface device 28 via a vehicle cable 42, where the interface device 28 is in turn coupled with a local computer 30. In step 204, a diagnostic scan is performed by way of a diagnostic application scan program being run, such as one of scan program 53a, 53b, 53c or another, to acquire vehicle data information in the form of a scan log file. As shown in step 206, the obtained scan log file in its native format is stored, such as in memory 50 of computer 30. As per step 208, the diagnostic evaluation tool 50c is then run on the scan log file or files where, as discussed above, diagnostic evaluation tool 50c opens, reads and translates the scan log file regardless of the native file format, and parses the various information to extract particular diagnostic data from the scan log file, such as the DTC 63, fault description 65, and fault status 67. At step 210 diagnostic evaluation tool 50c then stores the extracted diagnostic data in the scan database 59, which may reside in memory 50 of computer 30. A user, such as a mechanic 24, may then generate a diagnostic detail report 61 at step 212.

In the illustrated embodiment vehicle interface device 28 and local computer 30 are shown as separate components making up a local computer system 76, that is with local computer 30 being proximate at the repair facility such that it is proximate the vehicle 22. In an alternative arrangement, interface device 28 and computer 30 may be integrated in a single computer device, which would likewise be proximate the vehicle at the repair facility. Still further, the illustrated embodiment discloses diagnostic evaluation tool 50c as residing on local computer 30. It should be appreciated, however, that diagnostic evaluation tool 50c may reside on remote computer 64, with scan log files, such as files 55a, 55b, 55c, being transmitted via Internet 70 to remote computer 64 for use with diagnostic evaluation tool 50c. This may further include, for example, diagnostic detail reports 61 subsequently being transmitted from computer 64 to local computer 30. Remote computer 64 may also be used to operate local computer 30, and in particular to operate diagnostic scanning programs and diagnostic evaluation tool independent from actions by a local operator, such as mechanic 24.

Figure 7:
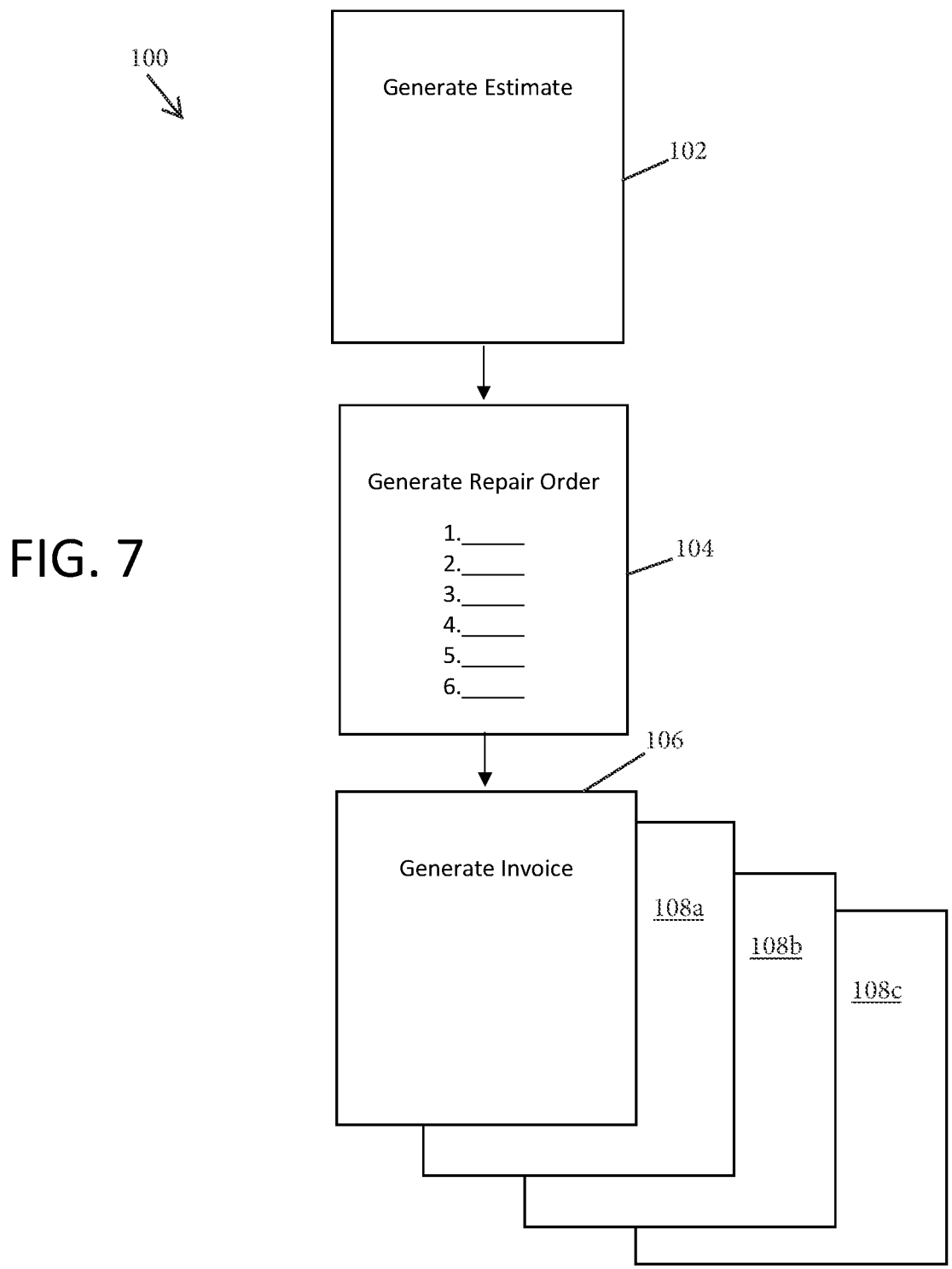
FIG. 7 is a schematic illustration of a service documentation system in accordance with an aspect of the present invention.

Referring to the drawings, an exemplary vehicle service documentation system 100 and methods for monitoring and capturing vehicle repair data and selected procedural documents from various sources for a repair service performed on a vehicle are described, where the vehicle repair data is automatically attached to an electronic invoice. With reference to FIGS. 1, 2, and 7, and as discussed in more detail below, in an exemplary embodiment an electronic estimate file 102 may be generated for repair of a vehicle 22 requiring service, such as by an estimating software 132 (see FIGS. 7 and 12). Upon initiating repairs based on the estimate file 102, a repair order 104 may be generated, such as from the estimating software 132, where the repair order 104 comprises an electronic file that details the repair services required for repair of the vehicle 22. An electronic invoice file 106 is also generated, and in accordance with aspects of the present invention repair service documentation data files 108 (shown as 108a, 108b, 108c in FIG. 7) are attached so as to be combined or linked to the invoice file 106, where the documentation data files 108 are provided from a number of sources and automatically attached to the invoice file 102 for purposes of confirming and validating what services were performed, how they were performed and the results thereof, including for insurance and liability purposes. The repair service documentation files 108 may comprise manufacturer repair procedures, manufacturer position papers, images of vehicle damage, images of vehicle repairs, diagnostic test data results, calibration results, and the like. The vehicle service documentation system 100 may be employed across one or more computing, testing and diagnostic devices for generating and obtaining the documentation data files 108. The electronic invoice file 102 with attached repair service documentation data files 108 is retained, such as in a memory of a computing device such as computer 30 and/or 64 and/or in the servers 212, 214.

In an exemplary embodiment, initial repair service documentation data files 108 that may be obtained comprise manufacturer repair procedures, manufacturer position papers, and other service instructions. The vehicle service documentation system 100 may automatically obtain this information from one or more databases via a network 70, such as the server 212 or server 214 associated with a remote computer or portal 64. The vehicle service documentation system 100 may automatically retrieve such service documentation data files 108 based on the repair order 104, which is specifically directed to a particular make, model and year of vehicle as established by the electronic estimate file 102. These service instruction documentation data files 108 may then be accessible to a service technician 24, such as via a computing device 30 or via a diagnostic tool 28. It should be understood that while FIG. 7 illustrates three separate service documentation data files 108a, 108b, 108c being attached to electronic invoice file 106 that fewer or more than three such files may be attached.

The vehicle service system 20 automatically provides additional vehicle repair data documents 108 during a variety of repair procedures, calibrations, and alignments that may be necessitated for a vehicle with damage, including where services may be provided across multiple service providers for use by the vehicle service documentation system 100. Such exemplary repair services that may be required due to damage, may include, for example, an ADAS safety system repair, replacement, calibration and/or service, body work, pre- and post-service calibration diagnostic scans, test drives, calibration procedures, module programming or reprogramming, air conditioning chemistry recovery and recharging, ADAS camera and radar calibrations, and the like. The vehicle service system captures documentation regarding what services are required, the repair instructions for such services, as well as confirmation of the repairs, including documents on the replacement parts used, as well as testing data (e.g., test results, scan data, which includes OEM diagnostic scans, calibration data, and the like) from the vehicle and/or information from a user or observer while the procedural steps of the service are being performed. The vehicle service system may also capture images of vehicle damage, pre- and post-service images, images of vehicle test and calibration setups, as well as images of procedural documents generated during the repair service (e.g., reports, test results, and other generated documents). As noted, the vehicle service system may also capture procedural documents that were selectively retrieved and utilized during the repair services, such as, original equipment manufacturer (OEM) repair instructions and procedures, OEM alignment and/or calibration procedures and instructions, and OEM diagnostic scan documents and procedures.

Figure 8:
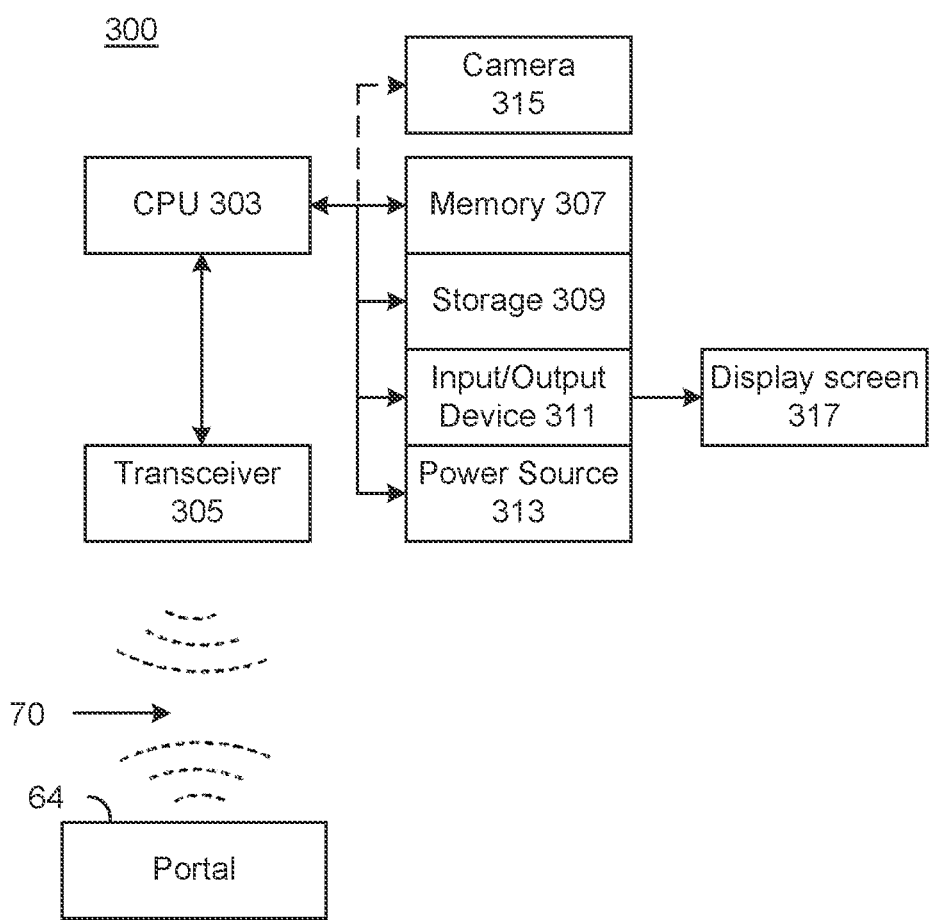
FIG. 8 is a diagram further detailing the diagnostic tool of FIG. 1 in accordance with the present invention; (consider removing)

As noted, the vehicle service documentation system 100 is configured to automatically attach documentation data files 108 to an electronic invoice file 102. For example, one or more programs may interoperate together to associate data files 108 to an invoice file 102. In a particular embodiment, the invoice file 102 is retained within a repair facility computer device 30, the vehicle service documentation system 100 may obtain repair instruction files specific for the vehicle 22, such as based on make, model and/or year, from server 214 (or alternatively server 212) such as via a request to computer portal 64 from computer 64 via network 70, where the returned results are associated with the invoice file 102 and attached thereto. The repair instruction data files 108 may be automatically obtained and attached to the invoice file 102, such as upon generation of a repair order 104. Still further, separate equipment used in the repair of vehicle 22 may likewise be configured to automatically transmit data files 108 to computer 30 or remote computer 64, with those data files 108 being automatically associated and attached to the respective invoice file 102. For example, a vehicle diagnostic computer tool 28 used to diagnose the electronic system of vehicle 22 may receive information regarding the repair order and/or obtain information regarding the vehicle, such as the VIN. Upon completion of a diagnostic scan, the diagnostic data is transmitted to computer 30 (or remote computer 64) as a data scan log file that includes details regarding the repair order and/or vehicle information whereby the diagnostic data file 108 may also be linked to and automatically attached to the invoice file 102. Still further, a camera 315 may be used to take digital images of a vehicle 22, such as before and after repairs have been performed, or as setup for calibration with targets in position, or the like (FIG. 8). The digital image data files 108 from the camera 315 may in turn be transmitted to the computer 30 or remote computer 64, such as by being linked to a repair order 104 whereby the digital image data files 108 may likewise be automatically attached to the invoice file 102. Similar data files 108 from other components and equipment may be automatically attached to an invoice file 102, such as from distance sensors, wheel alignment systems, and the like. It should also be appreciated that a computer, such as repair facility computer 30, may initially retain the various data files 108 prior to attaching to an invoice file 102 during repairs with the electronic invoice file 102 being generated upon completion of the repairs to the vehicle 22.

The vehicle service system may include or receive information from a vehicle diagnostic computer tool for capturing test data while the diagnostic tool is in communication with the electronic system of the vehicle. The vehicle diagnostic computer tool may also selectively retrieve the procedural documentation based upon vehicle information. The selected procedural documentation may be retrieved from a local source or a remote computer. Images may be captured by the vehicle diagnostic computer tool, some other computing device, or through some other means. The vehicle service system uploads the documentation data files 108 such as test data, images, and documents to a remote computer to generate a report documenting the repair service, which may be attached to an invoice 106 for the repair services. Such documentation may be needed by or provided to the service provider, an insurer, a vehicle owner, or the like, to document that each service procedure that was specified and approved for the repair was provided during the repair service, and was necessary and for some even mandated, for example that certain repair services were necessitated by an OEM procedure or instruction. The documentation report and invoice may be provided to a vehicle owner, a service provider, or an insurer, or another interested party. The documentation report may be provided to a vehicle repair estimating software system, or the like, such as may have been used to generate a repair order 104 specifying the services to be provided and may be used to generate an invoice 106 upon completion of the repairs.

Figure 12:
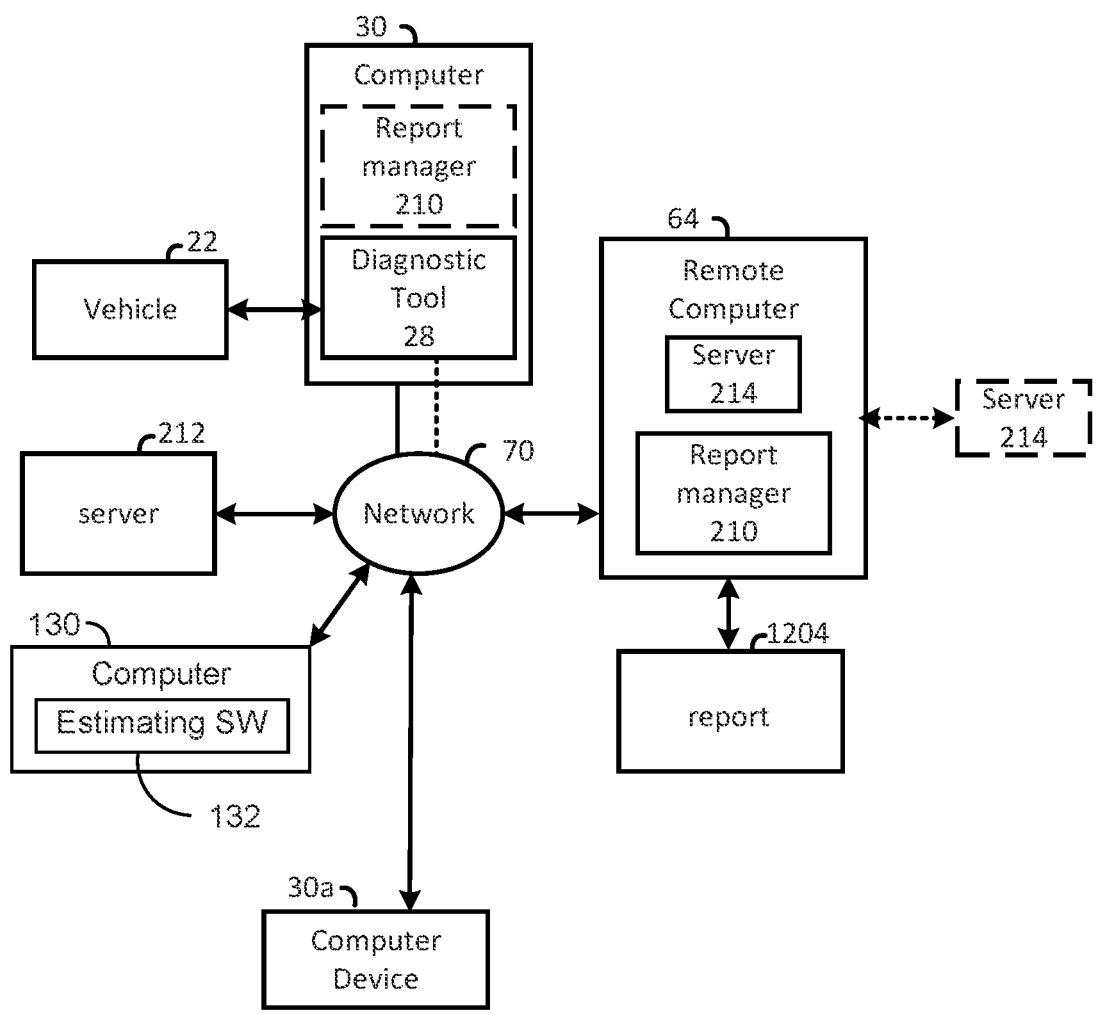
FIG. 12 is a diagram further detailing the vehicle service system configured for recording and storing test data produced during a repair service and capturing operational data via screen captures and screen recordings and other related images and videos for generating a report containing the test data and operational data.

FIGS. 1 and 12 illustrate a diagram of a vehicle service system 20 in accordance with one embodiment of the present application. A vehicle 22 is delivered to a service provider for repair services or testing to be done at a repair facility. For example, the repair service may be necessitated due to damage to the vehicle 22 due to a collision or other event causing damage to the vehicle 22. The service provider includes a computing device 30 that is operable to be in selective communication with a remote computing device or portal 64 via a network 70. The portal 70 is further in communication with a database on a server 214 accessed via remote computer 64. In an exemplary embodiment, the server 214 contains data of its own creation or that of a third party that provided data to the portal 64. The portal 64 is configured to receive service data about the work (e.g., repair work) to be done. It is contemplated that this order data could be automated or manual in nature. When, or if, the vehicle 22 is ready, or needs a service performed, this status is shown to the service provider. Alternatively, the computing device 30 may be operable itself to, for example, generate an estimate, a work order, and an invoice, as well as attach documentation thereto without having to be in communication with a remote database (via the server 214 accessed by the remote computer 64), such as by way of having its own such database.

In one embodiment, an exemplary vehicle repair estimating system or program, such as shown in FIG. 12, includes a remote computer 130 with a vehicle estimating software 132. The estimating software 132 may be used to generate a repair order for the vehicle 22, with a resulting post-repair report being used as confirmation of completion, as well as for documenting, such as for insurance purposes. The estimating software may be, for example, provided by Audatex North America, Inc. or by Enlyte Group, LLC, such as under its MITCHELL brand of estimating software, or may be provided by CCC Intelligent Solutions, such as under its CCC brand of estimating software. The vehicle repair estimating software is configured to receive information regarding damage to a vehicle and in turn document the repairs needed for the vehicle, including providing a cost estimate based on the type of damage to the vehicle, the repair parts thus needed and associated costs thereof, and the estimated time for repair including labor costs for such repairs, such as to create a detailed invoice for a vehicle owner, insurance adjuster, or the like. As part of this, the vehicle repair estimating software 132 is operable to list or detail all the repair steps necessary, including as specified by the vehicle manufacturer, including operations such as calibration processes for which a given repair facility, or service provider is not able to perform, and thus requires assistance from another service provider. Although estimating software 132 is shown in FIG. 12 as residing at remote computer 130, it should be appreciated that estimating software 132 may alternatively reside at computer 30 of service provider, or may be accessible by computer 30. As such, the service provider may receive or generate an electronic estimate file 102 as well as generate a repair order 104 using estimating software 132, and including generate an electronic invoice file 106 therefrom. The various files 102, 104, 106 may reside on one or both of the computer 30 of the service provider or the remote computer 64.

As illustrated in FIGS. 1 and 12, the vehicle service system 20 includes a vehicle diagnostic computer tool 28 that is operatively connectable to the electronic system of the vehicle 22, via the port 32, where the vehicle diagnostic computer tool ("diagnostic tool") 28 may be used to provide information to a user regarding a repair service to be performed, provide the individual procedural steps to the service to be performed, confirm proper completion of each of the procedural steps, and to record test data during the repair procedures and services carried out on the vehicle 22. Such test data includes information captured from the vehicle's electronic system. The diagnostic tool 28 also captures repair service documentation data 108, such as, test results, reports, and selected procedural documents retrieved as the procedural steps of the repair service are performed. The data 108 from the diagnostic tool 28 may be transmitted to the computing device 30 and/or remote computer 64 for attaching to the electronic invoice file 106. For example, upon completing a successful diagnostic scan of the electronic system of vehicle 22 using diagnostic tool 28, the scan results are automatically transmitted to the computing device 30 and/or remote computer 64 and attached to the electronic invoice file 106.

The computing device 30 and/or portal 64 may be used to determine if the vehicle 22 is ready for a repair service (e.g., a calibration, an alignment, or ADAS safety system service). When the service provider is ready to perform the requested and/or required service, the vehicle service system 20 is installed in the vehicle 22. As discussed herein, the diagnostic tool 28 is communicatively coupled to the electronic system of the vehicle 22. While the repair service is being performed, data 107, such as images, video, performance metrics, test data, and test results is captured by the vehicle diagnostic computer tool 28 and is transmitted to the portal 64 and/or computing device 30, with the data 107 being associated with vehicle 22 from which it was taken. As illustrated in FIGS. 1 and 12, the diagnostic tool 28 acquires the data 107 from the vehicle 22 and transmits the data 107 to the portal 64. As illustrated in FIG. 1, the diagnostic tool 28 is electronically coupled to the electronic control units (ECUs) of the vehicle 22. For example, in one embodiment, the diagnostic tool 28 is coupled to the vehicle ECUs via an ECU Interface or port 32, such as, an on-board diagnostic (OBD) diagnostic port 32 of the vehicle 22 in order to receive test data from the various ECUs, such as an engine ECU, a body ECU, brake ECUs, and other ECUs, such as Adaptive Driver Assistance Systems ("ADAS") ECUs, and including other electronic parts and components of the vehicle 22. The diagnostic tool 28 is shown connected to the ECU interface portal 32 via a vehicle cable 42.

By monitoring the electronic system of the vehicle 22 (and its electronic control units (ECUs), the vehicle repair service documentation system 100 of the vehicle service system 20 provides for the monitoring and recording of test data from the vehicle during the repair services. The recorded test data may then be transmitted to a computing device 30 of the service provider and/or to a remote computing device or portal 64, for confirmation, reporting and the like, including for purposes of insurance verification. To augment the test data, the vehicle service system 20 may also receive and input user/observer feedback via the manual input of data related to the performance and results of the procedural steps of the repair service.

The vehicle service documentation system 100 provides for the selective retrieval and capture of procedural documents which are used during the repair service while procedural steps of the repair service are being carried out. The procedural documents include, for example, procedural instructions, such as, original equipment manufacturer (OEM) repair instructions and procedures, OEM alignment and/or calibration procedures and instructions, and OEM diagnostic scan documents and procedures. The procedural documents may be selectively retrieved by the diagnostic tool 28 or the computing device 30 based upon vehicle information (e.g., vehicle make, model, year, and VIN). The procedural documents may be retrieved from a local memory, from the portal 64, or some other remote source. The selected procedural documents associated with the repair services of the vehicle 22 are stored (e.g., in the memory 307 or storage 309 of the diagnostic tool 28 or stored in the database of server 214 by accessing the portal 64).

The vehicle repair service documentation system 100 provides for the capture of images of vehicle damage, pre- and post-service images (e.g., pre-service and post-service images of setup, test equipment, and the like), and post-repair images of vehicle 22 (demonstrating the results of the repair services). The captured images may also include images of printed documents generated during the repair service (e.g., reports, test results, and other generated documents). The images may be captured by the diagnostic tool 28 or the computing device 30 (using camera 315). The images may also be captured by other means. Regardless of means, the captured images may be automatically transmitted or uploaded to computing device 30 and/or remote computing device 64 for attaching to invoice file 106. Still further, the images may be uploaded to the portal 64 to be included in the documentation that is used to generate the final report.

A user or observer can use the diagnostic tool 28 to monitor the procedural steps of the repair service as they are performed, review the procedural step results, reports, and associated documents that are generated, and to control the progress of the service (e.g., start/stop the repair service (e.g., a calibration), select a next step to perform during the repair service, and conclude the service and direct the diagnostic tool 28 to transfer the captured test data, test or procedural results, and resulting documents to the computing device 30 and/or portal 64). The diagnostic tool 28 may include an operator interface in the form of a display screen or touchscreen 317 to provide instructions and receive inputs from the user or observer. The diagnostic tool 28 can provide instructions and/or feedback to the user, such as instructions on how to perform the test or procedure of the service, including what procedural steps to take with regard to the type of service required. The instructions may be provided from the server 214, or another remote computer, or may be retained in memory of diagnostic tool 28.

The vehicle service system 20 enables an individual 24, such as a mechanic, vehicle owner, insurance representative, or the like, to be in communication with the computing device 30 and/or portal 64 via the network 70 via another computing device 30a, such as a tablet, mobile phone, laptop or other type of computer. The individual 24 is thus able to access the data 107 relative to the vehicle 22 to ensure, for example, that the service was performed, that it was completed properly, as well as to observe that the vehicle 22 was not abused or misused and that all systems, including ADAS safety systems, operate as designed. It is contemplated that the individual could be the actual owner, a representative thereof, an insurance provider or representative, dealer or representative, or any other party interested in the vehicle. For example, the service provider may be providing testing, calibration, or alignment services for yet another service provider that performed some repair work on vehicle 22, with individual being a representative of that other service provider. Thus, the individual will desire to receive documentation that demonstrates that the repair service was necessary and/or mandated by an original equipment manufacturer. As discussed herein, such documentation includes test data captured during the repair services, captured images of the vehicle, test setup, and repair service results, and selected procedural documents (e.g., printed test reports, OEM repair instructions and procedures, OEM alignment and/or calibration procedures and instructions, and OEM diagnostic scan documents and procedures) uploaded to the portal 115 during the repair service.

The vehicle diagnostic computer tool 28 may also be employed in a vehicle test drive system and method as disclosed in U.S. Pat. No. 11,373,465 and configured substantially in accordance with the vehicle computer system of U.S. Pat. No. 11,257,307 and/or the vehicle diagnostic device of U.S. Pat. No. 11,423,715, which are hereby incorporated herein by reference in their entireties. Accordingly, it should be appreciated that diagnostic tool 28 is connectable to the electronic system of the vehicle 22, such as via an OBD II port of the vehicle 22, to be in communication with the ECUs of the vehicle and obtain data therefrom.

Installing the vehicle service system 20 into the vehicle 22 includes electronically coupling the diagnostic tool 28 to the vehicle's ECU interface port 32 (via vehicle cable 42) to communicate with the vehicle's ECUs and receive test data from the ECUs while the procedural steps of the service are performed.

Vehicle diagnostic computer tool 28 may additionally be configured to enable or provide remote assistance from a remote technician connecting to the diagnostic tool 28, such as to observe diagnostic data or camera data, or to provide assistance or guidance in performing the procedural steps of the repair service. For example, the diagnostic computer tool 28 may include an internet interface for connecting with a remote computer via the internet. In one embodiment, for example, the remote computer may comprise the portal 28 that is accessed via the network 70. A remote technician may thereby access diagnostic tool 28 via portal 64 and network 70.

It will be understood and appreciated that the vehicle service system 20 operates in an electronic environment 300 that is created and exists within the vehicle service system 20. The environment 300 includes the portal 64 in communication with the computing devices 30, 30*a*, and the diagnostic tool 28 through the network 70. The computing devices 30, 30*a*, and the diagnostic tool 28 include components that allow for the device or tool to operate and perform calculations to enable the system. The components include a CPU 303 that directs the remaining components such as a transmitter 305, memory 307, storage 309, input/output devices 311 and a power source 313. It will be understood that these components function in harmony to create the environment wherein the vehicle service system 20 functions. The input/output devices 311 can include keyboards and display screens for data entry and test result monitoring. Optionally, the components (of the diagnostic tool 28 and the computing devices 30, 30*a*) can include a video and/or image camera 315 for recording and imaging the procedural steps of any required and/or requested service. The video camera 315 can also be configured to capture images during the service, such as to capture images of the vehicle (e.g., images depicting vehicle damage), any test or service setup, and of any printed documents generated by the procedural steps of the service which need to be documented and saved along with the data 107.

It is anticipated that there can be some differences between the components of the computing devices 30, 30*a*, and the diagnostic tool 28. For example, as discussed herein, the diagnostic tool 28 may be configured with full user input and test/repair procedure monitoring/review, and data retrieval (and the necessary user input/output). The CPU 303 of the diagnostic tool 28 or the computing devices 30, 30*a* may be in the form of a processor or micro-processor and include interface circuitry to facilitate communication between the ECUs and themselves, as well as with each other. Furthermore, their respective memory 307 and/or storage 309 may also include a database of vehicle protocols that allow communication with the ECUs of various makes and models of vehicles (via the diagnostic tool 28).

Figure 9:
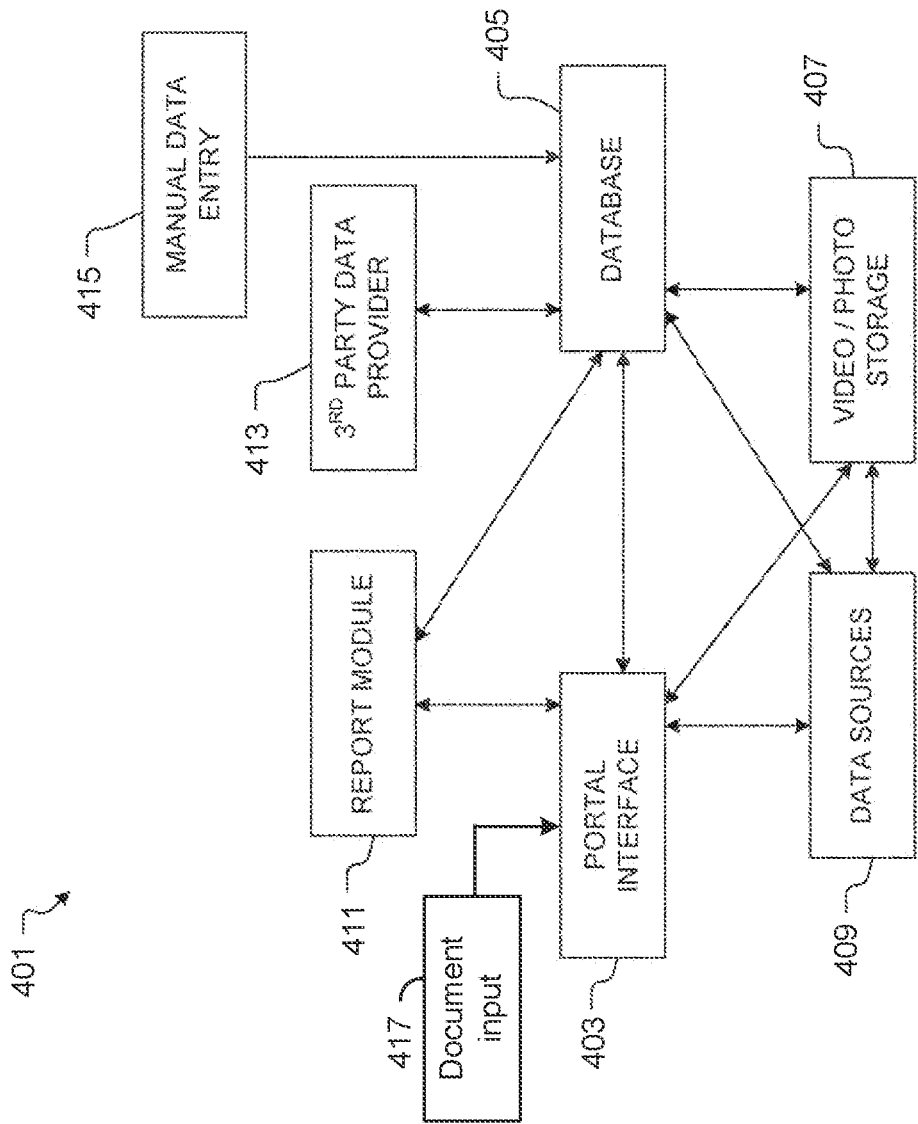
FIG. 9 is an exemplary schematic of the interactions of the vehicle service system of FIG. 1; (consider removing)

Referring now to FIG. 9, the interaction of the vehicle service system 20 is illustrated. It is contemplated that in an exemplary embodiment 401, that a portal interface 403 is the means whereby the service provider and the individual 24 interact with the portal 64. It is contemplated that the portal interface 403 provides access to the database 405, a report module 411, data sources 409, and a video/photo storage 407. It is contemplated that the database 405 is in communication with a third-party data provider 413 wherein information relevant to the work or status of the vehicle 22 is exchanged. It is contemplated that manual data entry 415 could be used to populate data in the database 405.

The data sources 409 are contemplated to be, for example, the test data from the diagnostic tool 28 (which is coupled to the vehicle ECUs), as well as the procedural documents, which include images captured before, during, and after the repair service, as well as captured procedural documents, such as, printed test reports, OEM repair instructions and procedures, OEM alignment and/or calibration procedures and instructions, and OEM diagnostic scan documents and procedures. The data sources 409 also include the captured images data. As discussed herein, the images data is sent to the video/photo storage 407. It is contemplated that these images data could also be automated, mechanical, human operators, or the like. That is, the images data could also include other sources of images data captured during the repair service of the vehicle 22. It is also contemplated that the data sources 409 comprise, for example, test or procedure results, reports, and selected procedural documents (e.g., OEM calibration procedures and instructions, OEM diagnostic scan data and instructions, and/or OEM procedural documents), and are stored in the database 405. The documentation data sources could also be received via the document input 417 for storage in the database 405.

Figure 11:
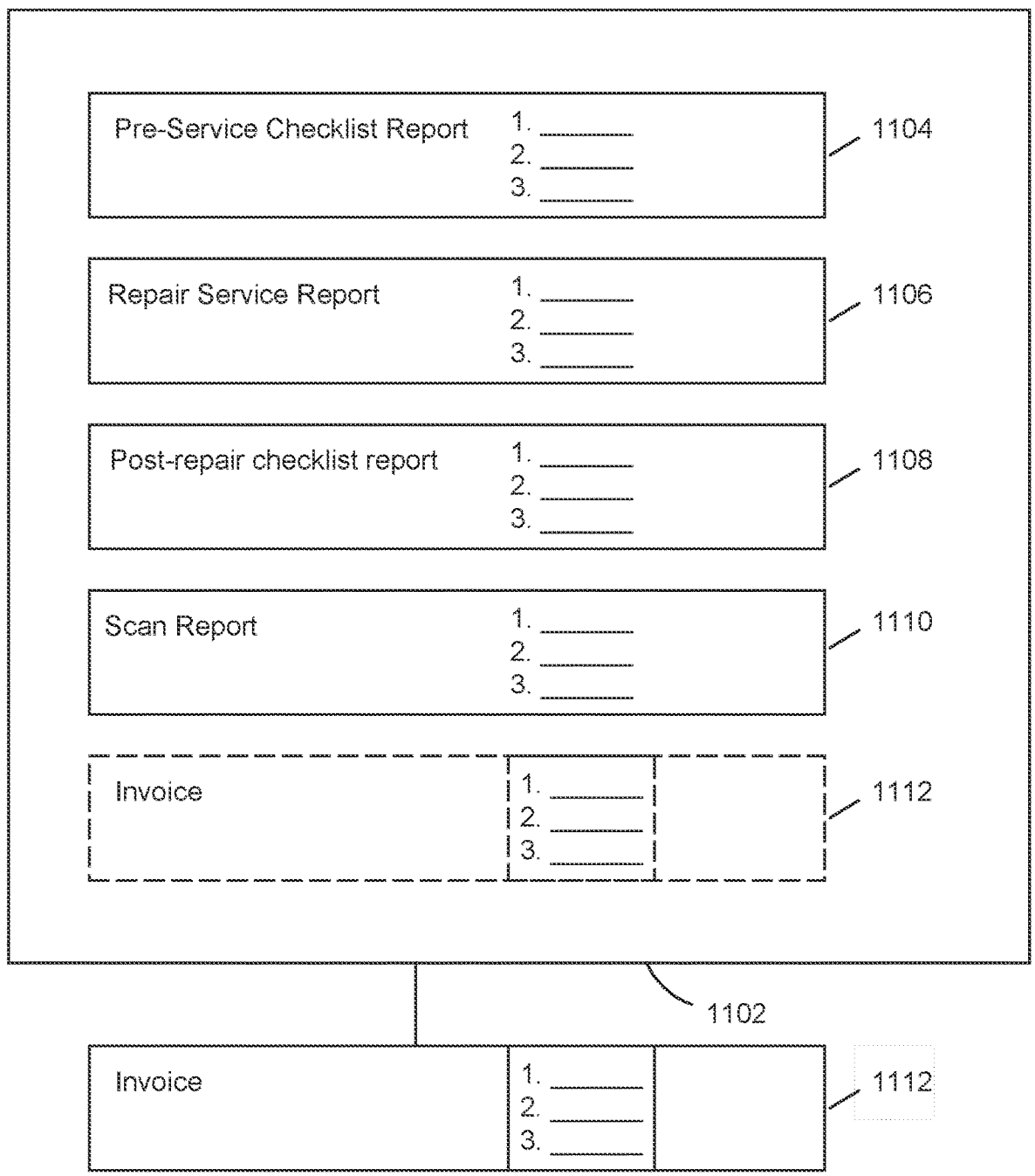
FIG. 11 is a diagram of an exemplary service report comprising a plurality of test data and document sources in accordance with the present invention.

An exemplary vehicle service documentation system 100 of the vehicle service system 20 provides for the attachment of selected test data, documentary images of the vehicle and repair procedures, and selected procedural documents to an invoice for a repair service (e.g., a repair, replacement, alignment, or calibration service) (see FIG. 11). As described herein, the documentary images includes images capturing service preparation, test or procedure setup, images of equipment and vehicle setup for the test or procedure, images of vehicle damages, images of the repair services, and post repair images of the vehicle. The selected test data may include test results, test reports, diagnostic reports, diagnostic scan reports and data, and other related documents. The selected procedures include, for example, repair service procedures used for the repair service, and any post-service review, checklists, and other related documents generated or captured. Such documents include, for example, original equipment manufacturer (OEM) repair, alignment, and/or calibration procedures and instructions, OEM diagnostic scan documents and procedures, and calibration results and reports. As discussed herein, the test data, images, and procedural documents are used to demonstrate that a repair service performed on the vehicle 22 was either necessary or mandated (e.g., necessitated due to OEM repair procedures and instructions). The documentation can be attached to an invoice for the service. In one embodiment, the documentation and/or a report generated from the documentation could be transmitted to the vehicle estimating software 132 of the remote computer 130 illustrated in FIG. 12. As discussed herein, the estimating software 132 may have been used to generate the repair order for the vehicle 22, with the report being used as confirmation of completion, as well as for documenting, such as for insurance purposes. The remote computing device 30 or the portal 64 can also use the data to populate and otherwise create an itemized invoice for the service rendered to the vehicle or the test drive itself.

Figure 10:
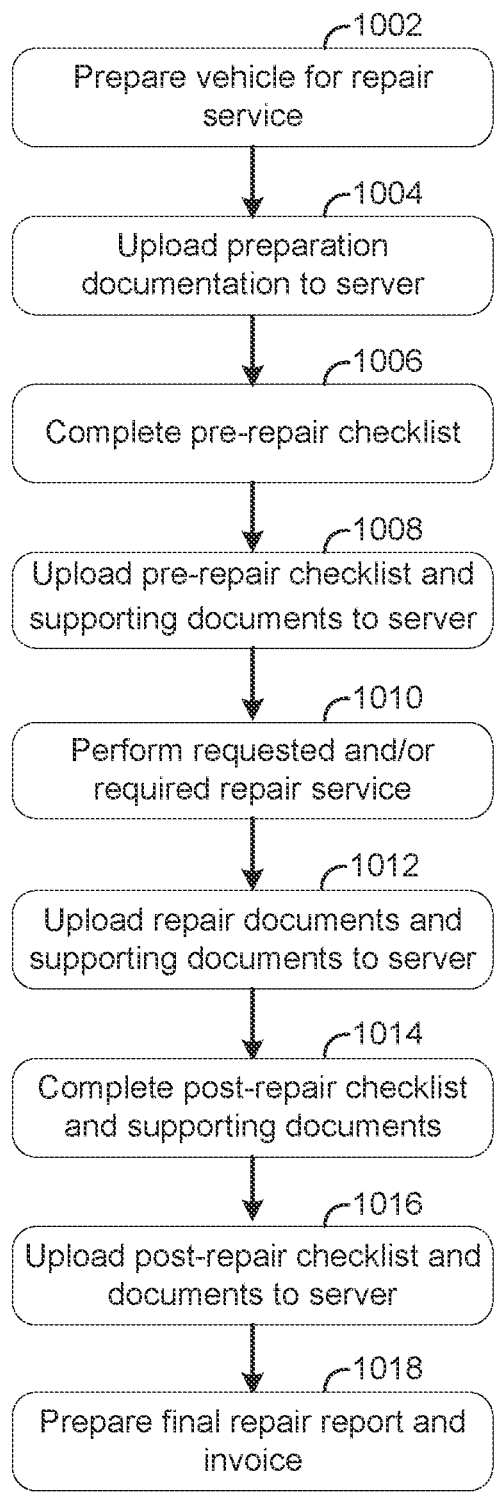
FIG. 10 is a flow diagram illustrating steps to a method for monitoring and recording the test data produced during a repair service and the capturing of procedural documentation for the repair service performed on a vehicle in accordance with the present invention.

FIG. 10 depicts the steps performed in a method 1000 for performing, monitoring, and documenting the repairs and/or other services as they are performed on a vehicle 22. As discussed herein, during the repair services, diagnostic testing may be carried out using the diagnostic tool 28, which outputs test data captured from the vehicle's electronic system. As discussed herein, the requester of the service may be the owner of the vehicle 22, an insurance representative, or another service provider that provided other services (e.g., a body shop) and now needs additional services performed (e.g., calibration and/or alignment, or the like). As discussed herein, the requester of the repair service may also originate from an estimating software system. Depending on the OEM specifications and requirements, the repair service may also be considered a required or mandated repair service to meet OEM specifications and requirements.

In step 1002 of FIG. 10, the vehicle 22 is validated for the repair service. Part of the preparation can include documenting the vehicle's make, model, year, VIN, and insurer, as well as confirming the procedural steps of the requested repair services conform with the OEM specification and requirements. The preparation includes selectively retrieving procedural documents based on the vehicle information (make, model, year, and VIN). The selected procedural documents may include, for example, relevant repair procedures, OEM calibration procedures and instructions, OEM diagnostic scan data and instructions, and/or OEM procedural documents for the repair services). The preparations may also include steps that provide documentation for the service provider that the vehicle 22 was ready for the service or repair, that the vehicle was in a safe condition, and that all and that all necessary safety and vehicle management steps were followed in preparing the vehicle 22 for the repair service. Such validation steps, may include, for example, a variety of vehicle safety and procedural steps. For example, the steps may include a verification that a mandated diagnostic scan before the repair was performed (and that the scan report has been uploaded to the portal 64). In step 1004 of FIG. 10, the documents acquired during the vehicle validation are uploaded to the portal 64 for a final report and invoice (see FIG. 11).

In step 1006 of FIG. 10, a pre-service checklist of items that need to be completed before the repair service are performed. The pre-service checklist items are performed and documented to ensure that the service provider has documentation for liability and invoicing purposes to confirm what was performed. These pre-service items include documentary images of the vehicle ((e.g., of test equipment setups, printed pre-service checklists, images of the vehicle's VIN, interior images of the vehicle, exterior images of the vehicle, images of any vehicle damages, test equipment setup images, calibration or service equipment setup images, images of printed documents related to the setup, and other images to document the setup and state of the vehicle 22). The pre-service items also include any required vehicle alignment checks, identification and setup of calibration targets, verifying/emptying the vehicle contents, and identifying and setting up any other targets or equipment needed for the service (as discussed, images would be taken of any equipment setup for the repair service). The images documentation can be performed using the camera 315 of the diagnostic tool 28. Alternatively, another camera can be used and uploaded to the portal 64 via the diagnostic tool 28 or through other means (e.g., uploading via the network 70). Any required procedural documents were selectively retrieved and utilized during the pre-service checklist and recorded to document the procedure that was followed. In step 1008 of FIG. 10, the test data and the procedural documents selectively retrieved and utilized during the pre-service checklist step are uploaded to the portal 64 via the network 70. The test data, images, and selected procedural documents may be locally stored on the diagnostic tool 28 and uploaded to the portal 64 for integration into the final report and invoice (see FIG. 11).

In step 1010 of FIG. 10, the repair service procedures is performed. As described herein, using the diagnostic tool 28, while any diagnostic steps are performed, the resulting test data can be monitored and captured. The diagnostic tool 28 is thus able to monitor and document the progress of the procedural steps of the service (e.g., the diagnostic, calibration, and alignment procedures). As each procedural step of the repair service is completed, the diagnostic tool 28 may also be used to monitor and confirm via any required diagnostic scans and test programs, that the procedural steps are being carried out. The resulting reports and other documentary evidence (diagnostic scan data and reports, calibration reports and data, and the like) are uploaded to the portal 64 for integration into the final report and invoice. Required procedural documents were selectively retrieved and utilized during the repair service and recorded to document the procedural steps of the repair service. Such documents include OEM instructions and procedures, OEM diagnostic scan instructions and documents, procedural instructions, and related documents. Images is also captured to document the procedural steps of the repair service, e.g., images of the vehicle damage, images of the vehicle after the repair service, images of the test equipment and repair equipment setups, and other images used to document the procedural steps of the repair service. In step 1012 of FIG. 10, the test data, images, and selected procedural documents used and/or generated during the procedural steps of the repair service are uploaded to the portal 64 for integration into the final report and invoice (see FIG. 11).

In step 1014 of FIG. 10, a post-repair checklist and documentation process is performed. The post-repair checklist may include post-repair diagnostic scans, alignment procedures, and testing procedures that are monitored by the diagnostic tool 28. The diagnostic tool 28 may be used to capture test data generated during the post-repair diagnostic scans, the alignment procedures, and the testing procedures. Procedural documents retrieved and utilized during the post-repair checklist are recorded to document the procedures followed. The procedural documents for the post-repair checklist may also include OEM documents related to the vehicle and for the particular service required and/or requested. Other Post-repair images is also captured to document the procedures followed. Such images may include, for example, post-service images of the vehicle (e.g., any vehicle repairs), images of test/calibration results, images of printed documents related to the procedural steps, and final images of the test or procedural equipment. In step 1016 of FIG. 10, the test data, images, and selected procedural documents generated or used during the post-repair checklist are uploaded to the portal 64 for integration into the final report and invoice.

Finally, in step 1018 of FIG. 10, the test data, test results, selected documents, reports, images, and anything else generated or retrieved before, during, and after the procedural steps of the repair service were performed, and which were uploaded to the portal 64, are used to generate a final report 1102. In one embodiment, the final report 1102 is a documentary report integrated or attached to an invoice 1112. In one embodiment, the final report 1102 is attached to the invoice. As discussed herein, the estimating software 132 may have been used to generate the invoice 1112. The remote computing device 30 or the portal 64 can also use the data to populate and otherwise create an itemized invoice for the service rendered to the vehicle or the test drive itself.

In one embodiment, the final report 1102 includes a pre-service checklist report 1104, a repair service report 1106, a post-repair report 1108, a diagnostic scan report 1110, and an invoice 1112. The pre-service checklist report 1104 includes the test data, reports, images, and selected procedural documents generated or retrieved during the pre-service checklist steps. The repair service report 1106 includes the test data, test results, associated reports, retrieved procedural step documents, images, and supporting documents generated or retrieved during the repair service. The post-repair checklist report 1108 includes the test data, reports, images, and selected procedural documents generated or retrieved during the post-repair checklist steps. The diagnostic scan reports 1110 include all of the documents generated during any pre-service diagnostic scans, any diagnostic scans run during the repair service procedures, as well as from any scans run post-repair to confirm/validate the repair service. The invoice 1112 includes the individual billing statements for each service procedure performed and/or for each portion or procedural step of a service performed. As discussed, the invoice 1112 may also include the other components of the final report 1102 (the pre-service checklist report 1104, the repair service report 1106, the post-repair report 1108, and the diagnostic scan report 1110). The final report 1102 (including or attached to the invoice 1112) may be stored in the server 214,212 and made available to an individual, such as the owner, and the service provider. In one embodiment, the final report 1102 is separate from the invoice 1110 and is attached to the invoice 1110 as a separate document (FIG. 11).

While the diagnostic tool 28, as discussed herein, conforms with the SAE J2534 standard, it should be appreciated that alternatively configured vehicle diagnostic tools may be employed (for monitoring the performance and procedural steps of a test drive) within the scope of the present embodiments, including alternatively configured tools for alternative types of vehicles, such as alternative classes of vehicles. Accordingly, an interface tool of the diagnostic tool 28 may conform with the ISO 22900 standard, or RP1210 standard, or may operate under the ELM327 command protocol.

As noted, the software and/or hardware of diagnostic tools may be required to be updated to operate with new vehicles and/or enable programming and diagnosing of existing vehicles. In the above noted embodiments, the diagnostic tool 28 may be periodically updated via an Internet connection, or may be returned to the supplier for updating, including with regard to hardware updates. This may be done by the supplier of the diagnostic tool 28, whereby the local operator need not spend time attempting to maintain the equipment.

In a further illustrated embodiment, the diagnostic tool 28 is implemented as a laptop computer with integrated monitor, keyboard, and mouse.

Figure 13:
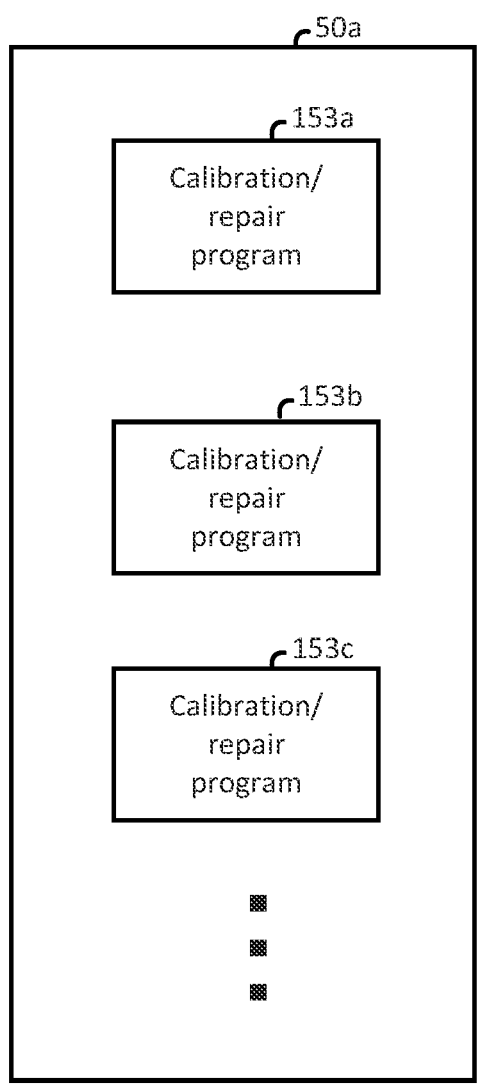
FIG. 13 is a block diagram of calibration and/or diagnostic applications of the vehicle diagnostic system of FIG. 2.
Figure 14:
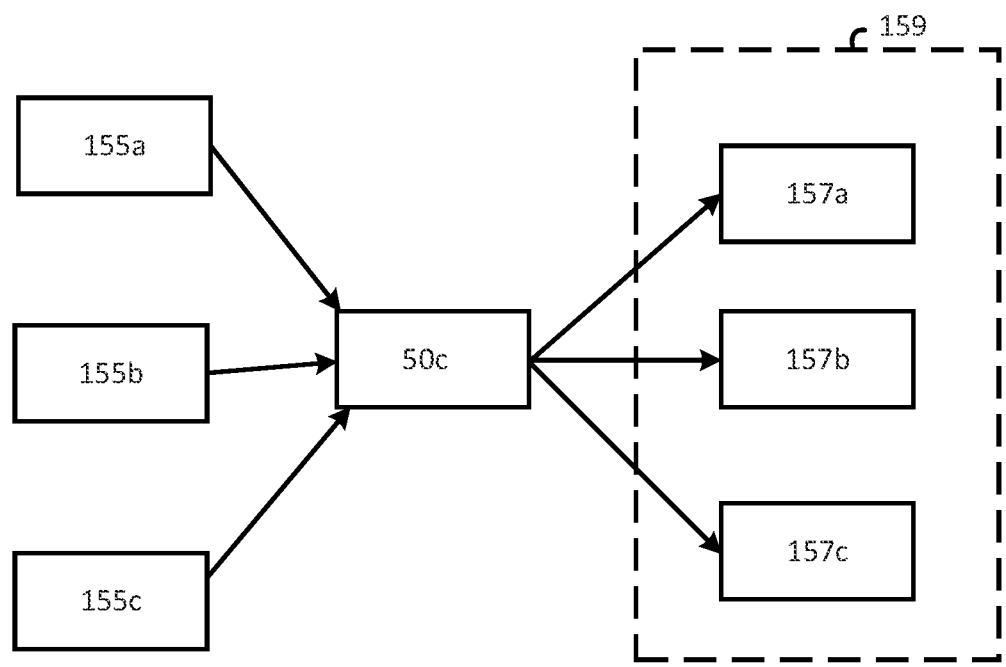
FIG. 14 is a schematic illustration of the use of a calibration and diagnostic evaluation tool with calibration and/or diagnostic data/log files in accordance with the present invention.
Figure 15:
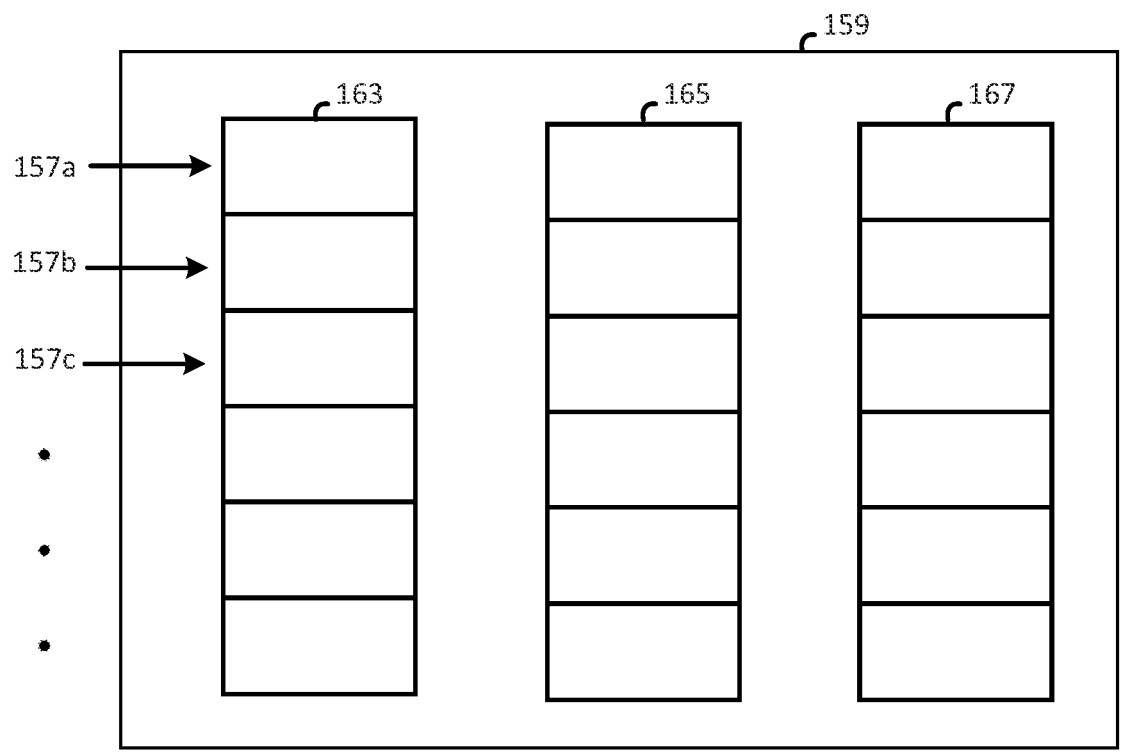
FIG. 15 is a block diagram of a database storing calibration and/or diagnostic data obtained from the use of a calibration and diagnostic evaluation tool in accordance with the present invention.
Figure 17:
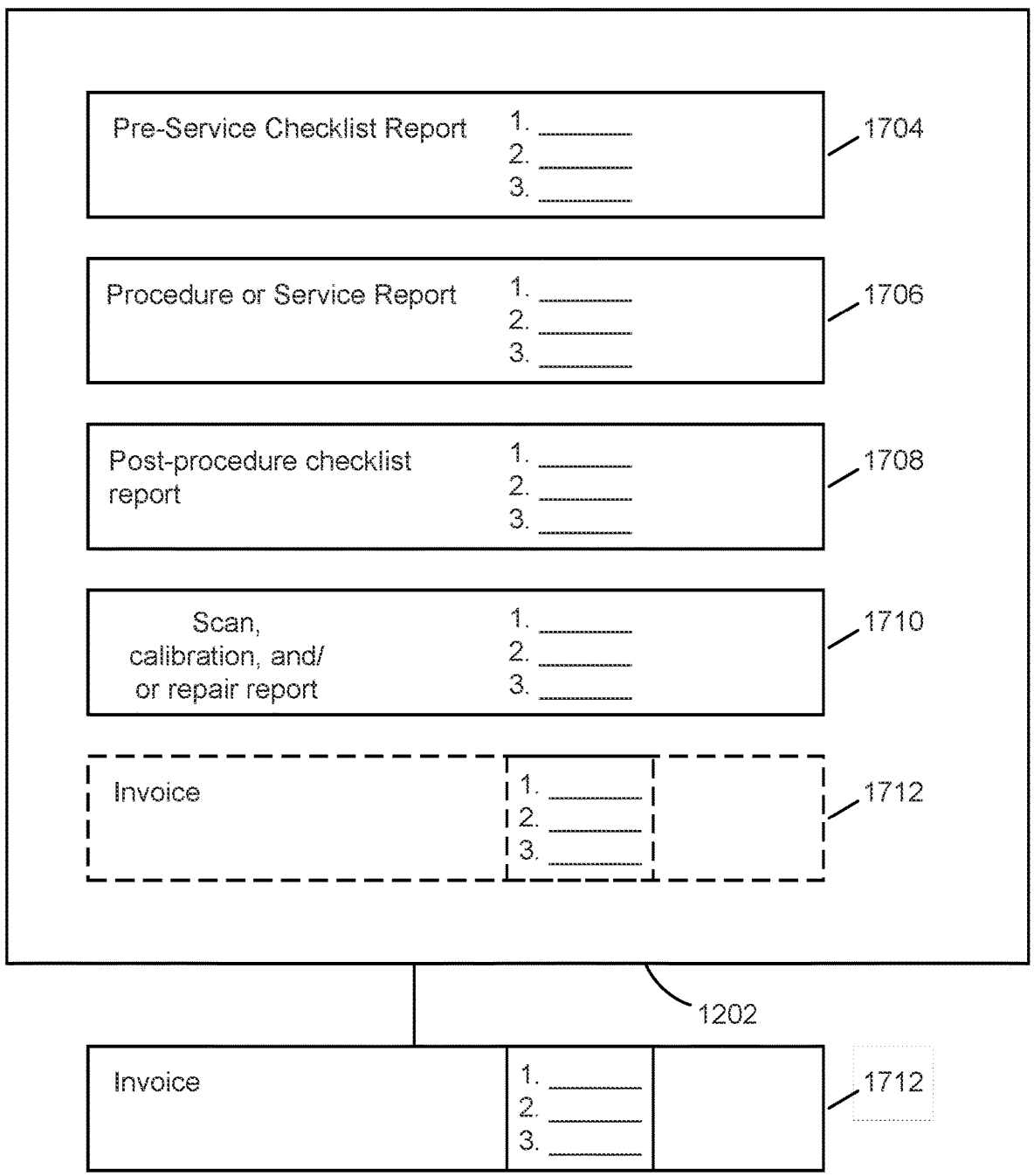
FIG. 17 is a diagram of an exemplary service report comprising a plurality of calibration, diagnostic, and/or test data and documentation files in accordance with the present invention.
Figure 18:
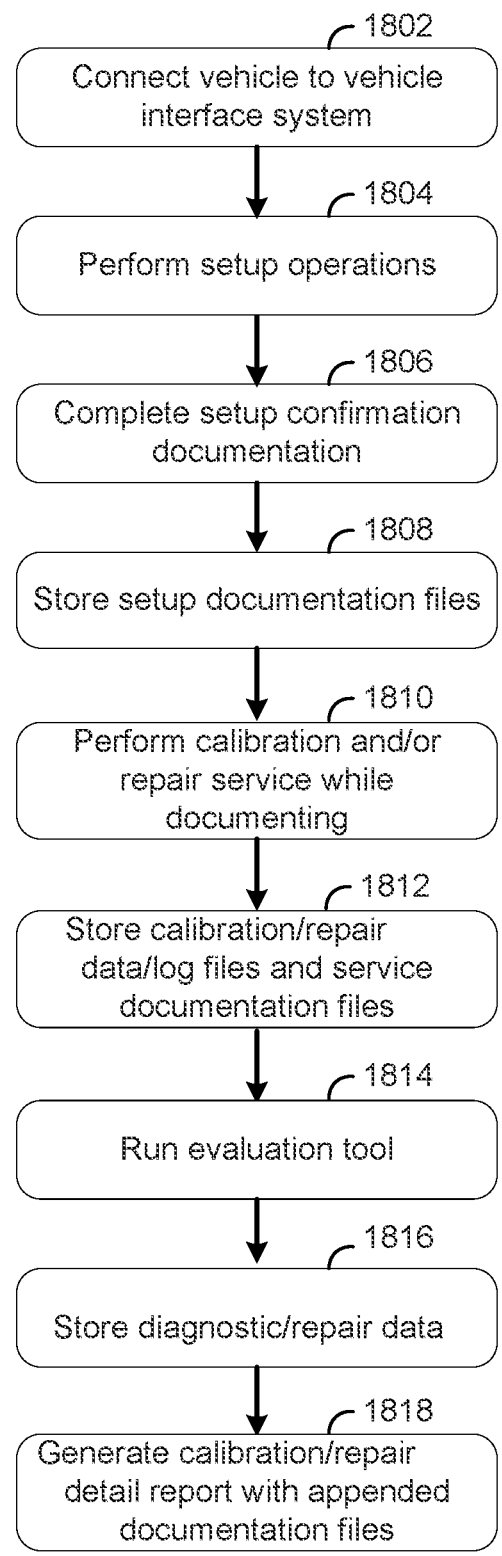
FIG. 18 is a flow diagram of a method for generating a calibration/diagnostic detail report that includes setup and service documentation captured during the services performed on a vehicle in accordance with the present invention.

Referring to FIGS. 1 and 13, the vehicle diagnostic system 20 includes diagnostic tools 50a that include calibration and/or repair tools for performing a variety of calibration and/or repair services on the vehicle 22 with a calibration/repair program, such as the one or more calibration and/or repair application programs 153a, 153b, 153c stored in the memory 50 of local computer 30, where a different calibration/repair application program is run depending on the make and model of the vehicle, and the type of calibration or repair service needed. The procedures performed by or with the different calibration/repair application programs 153a, 153b, 153c result in the generation and acquisition of calibration/repair diagnostic data while the calibration and/or repair procedures are being carried out. From the calibration/repair diagnostic data, diagnostic data reports, or calibration/repair log files for each serviced vehicle, such as calibration and/or repair data/log files 155a, 155b, 155c (FIG. 14), that may also be stored in memory 50 of local computer 30. The calibration/repair application programs 153a, 153b, 153c may be provided from different entities, including for example, different original equipment manufacturers (OEMs), with the calibration and/or repair data/log files 155a, 155b, 155c generated by system 20 differing based on the particular vehicle being serviced, as well as the calibration/repair application program used, including with regard to file format and/or content. The diagnostic evaluation tool 50c is further operable to process the calibration and/or repair data/log files regardless of file format to obtain selected calibration and/or repair diagnostic data, such as calibration/repair diagnostic data 157a, 157b, 157c (FIG. 14), from each calibration and/or repair data/log file and output the calibration/diagnostic data in a uniform format to a calibration/diagnostic database 159 (FIGS. 14 and 15) from which a user is able to generate a detailed calibration and/or diagnostic report (e.g., documentation report 1702) (illustrated in FIG. 17 and described in detail herein). The calibration and/or repair diagnostic report thus comprises selected information from each of the calibration and/or repair data/log files whereby the information is readily consolidated into a common format and file type. Still further, diagnostic evaluation tool 50c may be used to transmit the calibration and/or repair diagnostic reports such as via an Internet connection 70 for remote view and use.

In the illustrated embodiment, computer 30 is operatively connected with vehicle interface device 28, with computer 30 including one or more commercially available calibration and/or repair application programs 153a, 153b, 153c (FIG. 13), where the calibration/repair programs may be configured for use with different variations of vehicles, such as by make, model, model year and/or vehicle systems or options (as well as according to a particular calibration and/or repair procedure). Accordingly, a particular calibration/repair application program 153a, 153b, 153c will be selected depending on the specific vehicle 22 being serviced, as well as based upon the type of calibration and/or repair service to be provided the vehicle 22. Although shown as only including three calibration and/or repair application programs 153a, 153b, 153c, it should be appreciated that system 20 may include fewer than three or more than three such programs that are available for use with various vehicles (and various associated calibration and repair procedures). For example, a general service repair facility may service vehicles manufactured by a wide range of OEMs, including a wide range of models and model years of vehicles, and thus utilize numerous calibration and/or repair application programs.

As illustrated in FIGS. 2 and 13, the calibration and/or repair application programs 153a, 153b, 153c are stored in a memory 50, where the calibration/repair tool is configured to enable the reading and monitoring of calibration data and repair data and reports. An exemplary calibration/repair application program comprises a program provided by an automotive OEM, such as General Motors ("GM"), Ford, FCA ("Fiat Chrysler Automobiles" or "Chrysler"), Bayerische Motoren Werke ("BMW"), Honda, Nissan, Toyota, Mercedes or the like. Alternatively, a calibration/repair application program may be provided by a company that supplies calibration and/or repair application programs, such as Snap-On Incorporated. Additionally, the provided programs may include one or more calibration or repair procedure. In practice, as noted, memory 50 may include multiple calibration/repair application programs, each for use with various makes and/or models of vehicles to enable calibrating, diagnosing, and programming of vehicle hardware and ECUs via vehicle interface device 28, including depending on the particular vehicle systems/ECUs on the vehicle installed by the OEM based on the customer's selection of vehicle options.

It should be appreciated that calibration and/or repair application programs 153a, 153b, 153c are provided in various computer software formats, configurations and/or languages, including for example, depending on the supplier of the calibration and/or repair application program, such as depending on the OEM. As is known by those skilled in the art, each OEM provides their own unique calibration and/or repair programs.

Upon running a given calibration and/or repair application program 153a, 153b, 153c via vehicle interface 28, vehicle interface 28 returns a calibration and/or repair data/log file 155a, 155b, 155c reporting the status of the electronic system 23 of vehicle 22, with the associated calibration and/or repair data/log file 155a, 155b, 155c being stored in memory 50. Although shown to include three calibration and/or repair data/log files 155a, 155b, 155c, it should be appreciated that a separate calibration and/or repair data/log file will exist for each vehicle that has been calibrated and/or diagnosed via system 20. Moreover, corresponding to the differences in the various computer software formats for the calibration and/or repair application program 153a, 153b, 153c depending on the calibrated and/or diagnosed vehicle, the returned calibration and/or repair data/log files 155a, 155b, 155c are correspondingly provided in various native file formats depending on the calibration and/or repair application program 153a, 153b, 153c used to perform the calibration and/or repair service performed on the vehicle 22. These calibration and/or repair data/log native file formats include, for example, text in portable document format ("PDF"), PDF images, and Hypertext Markup Language ("HTML"), as well as may be provided or stored in various formats, including as a compressed file, such as a PKzip or ZIP file.

It should be appreciated that in a repair facility numerous calibration and/or repair procedures may be performed, including across a wide variety of vehicles based on make, model and/or model year. Difficulties therefore occur in accessing and processing the information provided by the calibration and/or repair data/log files due to their differing file formats and content. Accordingly, as illustrated and understood from FIG. 14, system 20 utilizes diagnostic evaluation tool 50c on the collected calibration and/or repair data/log files, such as files 155a, 155b, 155c, to extract and provide relevant desired calibration and/or repair diagnostic data 157a, 157b, 157c to a scan database 159 in a common format. In particular, diagnostic evaluation tool 50c systematically reads the calibration and/or repair data/log files, or skims the results off a screen view, and places selected calibration and/or repair diagnostic data 157a, 157b, 157c in the form of text into calibration/repair database 159. Although shown as having obtained and generated calibration/repair diagnostic data 157a, 157b, 157c, it should be appreciated that system 20 may obtain and generate calibration and/or repair diagnostic data for each calibration and/or repair data/log file obtained via diagnostic evaluation tool 50c, with the calibration and/or repair diagnostic data being stored in the calibration/repair database 159. From calibration/repair database 159, one or more detail calibration/repair diagnostic reports 161 (see also FIG. 12 for a combined diagnostic and documentation report 1204, discussed in detail herein) may be generated, such as to evaluate calibration and/or diagnostic reports for a selected make of vehicle, or make and model of vehicle, or based on vehicle features, over a selected time period, or for a particular calibration and/or repair procedure.

In a particular embodiment, detail calibration and/or repair diagnostic reports 161 may be generated for individual customer vehicles at a repair facility. In this way, a common report format may be readily generated for use by a mechanic 24 when calibrating and/or diagnosing and presenting information to the customer regarding their vehicle, with the report automatically including calibration and/or repair diagnostic data information from the calibration and/or repair data/log file without the mechanic 24 or another individual having to manually review the calibration and/or repair data/log file and enter information into a report for the customer. In particular, the detail calibration and/or repair diagnostic report 161 is created regardless of make and model of vehicle, and specifically regardless of the calibration and/or repair application program 153a, 153b, 153c used to scan the customer's vehicle, and correspondingly regardless of the native file format of the calibration and/or repair data/log file 155a, 155b, 155c returned from the calibration and/or repair application program.

Diagnostic evaluation tool 50c may be further or alternatively used to transmit or upload the calibration and/or repair diagnostic data 157a, 157b, 157c to a cloud portal, such as at 64, whereat a database of the calibration and/or repair diagnostic data may be retained.

In the illustrated embodiment, diagnostic evaluation tool 50c comprises an application program operating within local computer 30. In use, diagnostic evaluation tool 50c operates to open and read the calibration and/or repair data/log files obtained by system 20, such as files 155a, 155b, 155c, with tool 50c operatively automatically detecting or recognizing the native format of the calibration and/or repair data/log files. This may include, for example, tool 50c detecting or triggering based on output files or content obtained from running of a given calibration and/or repair application program 153a, 153b, 153c. Diagnostic evaluation tool 50c additionally reads and translates the calibration and/or repair data/log file data into a desired format, where necessary. In the illustrated embodiment, for example, diagnostic evaluation tool 50c translates the scan log file information into HTML format. Various .NET modules may be used for translating and parsing of the calibration and/or repair data/log files. For example, PDF image files may be translated and parsed using IronOcr software supplied by Iron Software LLC of Chicago, Illinois, such as IronOCR v4.4.0; PDF text files may be translated and parsed using iText software supplied by iText Group nv of Belgium, such as iText7 v7.1.2; and HTML native files may be parsed using Html Agility Pack ("HAP") provided by ZZZ Projects. It should be appreciated that alternative programs may be employed for opening, reading, translating and/or parsing the calibration and/or repair data/log files, and should be further appreciated that a diagnostic evaluation tool in accordance with the present invention may comprise multiple modules cooperatively working together. Still further, and as noted above, diagnostic evaluation tool 50c may alternatively be employed to extract or pull desired calibration and/or repair diagnostic data information by way of skimming selected data from a screen view of the calibration and/or repair data/log file.

Figure 16:
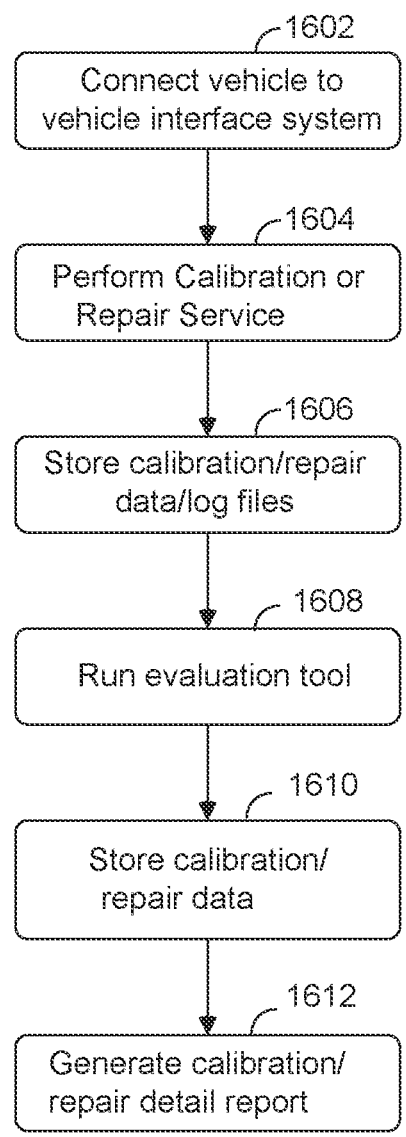
FIG. 16 is a flow diagram of a method for generating a calibration and diagnostic detail report in accordance with the present invention.

As noted, diagnostic evaluation tool 50c extracts or pulls selected information from calibration and/or repair data/log files 155a, 155b, 155c for placement in calibration/repair database 159. For each of the calibration and/or repair data/log files in the illustrated embodiment, as understood from FIG. 16, diagnostic evaluation tool 50c pulls from the calibration and/or repair data/log file the resulting calibration and/or repair event or step result data 163 from a given calibration and/or repair procedure, the description 165 of the calibration and/or repair procedure event or step, and the procedure event or step state 167 for that calibration and/or repair event or step, with that information then stored in a common format within scan database 159. It should be appreciated that calibration/repair database 159 additionally includes information regarding the make and model of vehicle, the VIN and other identifying information.

Database 159 thus allows calibration and/or repair diagnostic detail reports 161 to be readily generated. For example, in a repair facility a mechanic 24 may generate a report 161 for a customer specific to the customer's vehicle providing details regarding the vehicle and incorporating information from the calibration and/or repair data/log file as stored in database 159. Additionally or alternatively, reports may be run to evaluate a given make and model (and according to the calibration and/or repair procedure(s) performed), including such as over time to assess fault history.

A method of generating calibration and/or repair diagnostic detail reports 161 in accordance with aspects of the present invention as described above is disclosed with reference to FIG. 16. As there shown, in step 1602 a vehicle 22 to be evaluated is communicatively coupled to a vehicle interface device 28 via a vehicle cable 42, where the interface device 28 is in turn coupled with a local computer 30. In step 1604, the steps of a calibration and/or repair procedure are performed by way of or with a calibration and/or repair application program being run, such as one of calibration/repair program 153a, 153b, 153c or another, to acquire and/or monitor calibration and/or repair diagnostic data information concerning the vehicle 22 in the form of a calibration and/or repair data/log file. As shown in step 1606, the obtained calibration and/or repair data/log file in its native format is stored, such as in memory 50 of computer 30. As per step 1608, the diagnostic evaluation tool 50c is then run on the calibration and/or repair data/log file or files where, as discussed above, diagnostic evaluation tool 50c opens, reads and translates the calibration and/or repair data/log file regardless of the native file format, and parses the various information to extract particular calibration and/or repair diagnostic data from the calibration and/or repair data/log file, such as the calibration and/or diagnostic procedural event or step result data 163, calibration and/or repair procedural event/step description 165, and calibration and/or repair procedural event/step status 167. At step 1610 diagnostic evaluation tool 50c then stores the extracted calibration and/or repair diagnostic data in the calibration/diagnostic database 159, which may reside in memory 50 of computer 30. A user, such as a mechanic 24, may then generate a calibration and/or repair diagnostic detail report 161 at step 1612.

In the illustrated embodiment vehicle interface device 28 and local computer 30 are shown as separate components making up a local computer system 76, that is with local computer 30 being proximate at the repair facility such that it is proximate the vehicle 22. In an alternative arrangement, interface device 28 and computer 30 may be integrated in a single computer device, which would likewise be proximate the vehicle at the repair facility. Still further, the illustrated embodiment discloses diagnostic evaluation tool 50c as residing on local computer 30. It should be appreciated, however, that diagnostic evaluation tool 50c may reside on remote computer 64, with calibration and/or repair data/log files, such as files 155a, 155b, 155c, being transmitted via Internet 70 to remote computer 64 for use with diagnostic evaluation tool 50c. This may further include, for example, calibration and/or repair diagnostic detail reports 161 subsequently being transmitted from computer 64 to local computer 30. Remote computer 64 may also be used to operate local computer 30, and in particular to operate calibration and/or repair programs and diagnostic evaluation tool independent from actions by a local operator, such as mechanic 24.

Referring to FIGS. 1-19, in addition to the scan data, the calibration and/or repair diagnostic data, and the scan log files or calibration/repair data/log files from the above described scan program and calibration/repair program outputs, the system 20 can be further configured to monitor and/or capture a variety of additional documentary data types while the steps of a procedure (e.g., scan, calibration, or repair) are performed on the vehicle 22 with the captured data recorded or stored in a server 214, 212 for later recall and report generation (FIG. 12). In accordance with an embodiment of the present invention, the system 20 includes an exemplary vehicle repair service documentation system 100 that includes a report manager 210 configured to append screen captures, screen recordings, and associated images and videos to document the performance of the associated scans, calibrations, and repair procedures. Such documentation can also include the documentation of individual steps within the procedures. As illustrated in FIG. 12, the report manager 210 can be located in the remote computer 64 or the local computer device 30.

Figure 19:
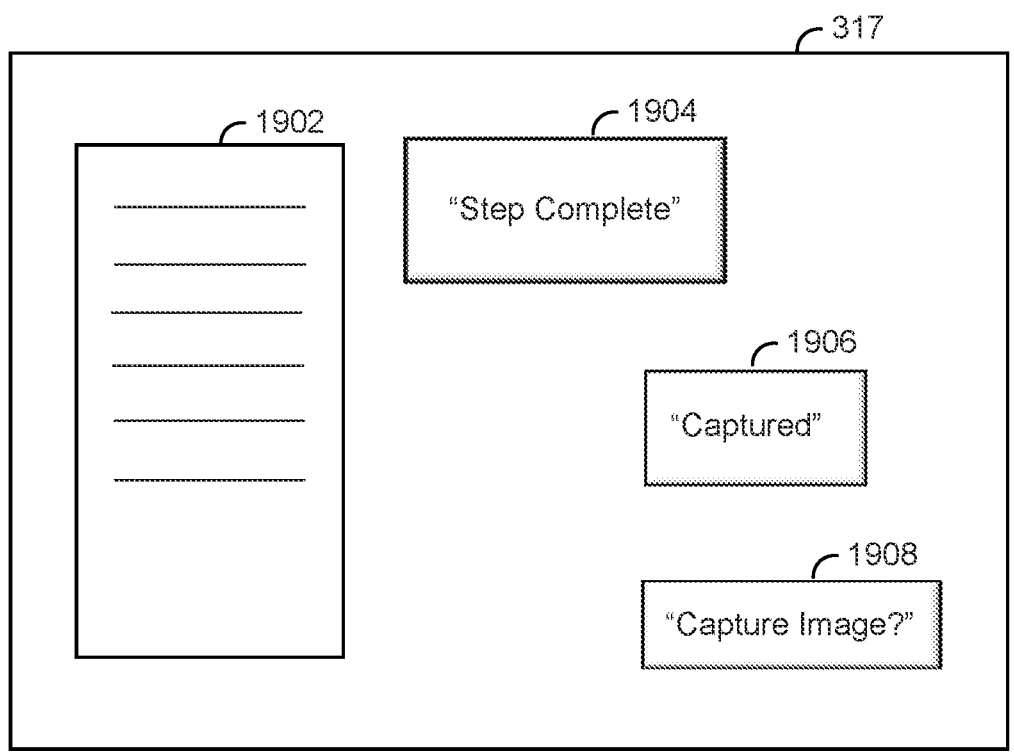
FIG. 19 is a diagram of an exemplary display screen illustrating the display of procedural data related to executed procedures.

An exemplary documentation report 1204 can include pre-service checklist report(s) 1704, procedure or service report(s) 1706, post-procedure checklist report(s) 1708, and any associated scan, calibration, and/or repair diagnostic report(s) 1710 (FIG. 16), along with one or more of accompanying screenshots, screen captures, images, video screen recordings, videos, and the like, for automatically capturing OEM software application information as it relates to particular procedural steps that are not otherwise included, captured, or documented in any conventional OEM applications, and saving the reports, scans, images, videos, and other types of documentary data to a selected location. Optionally, the acquisition of screen captures and screen recordings can be according to a prompt provided to a user. Additionally, the display screen 317 also includes an optional user interface panel 1908 that provides user initiated screen captures or screen recordings (FIG. 19). As described herein, the documentation report 1204 can be configured or formatted as a single report (with attachments or links) that includes any selected data files related to any OEM scans, calibrations, or repair procedures (e.g., scan data 57a, 57b, 57c and calibration/repair diagnostic data 157a, 157b, 157c), as well as related screenshots, screen captures, screen recordings, and images and/or video recording of any OEM software application display screen information during the performance of the steps for any selected scans, calibrations, and/or repair procedures.

Note that the report manager 210 can format the documentation report 1204 to include any of the pre-check and post-check list reports, the procedure reports, the scan reports, and the calibrations and repair diagnostics reports (including ADAS calibration and repair), along with any documentary screen captures, images, screen recordings, and any video recorded and saved. Thus, the exemplary documentation report 1204 can be used to document the procedures performed on a vehicle (e.g., vehicle 22), any pre- or post-repair checklist reports (and their associated steps and criteria), diagnostic scans and associated data, calibrations (and associated test equipment and target setup, arrangement, and corresponding documentation), and repair procedural steps (including preparation, performance, and any checklists)), as well as providing documentary evidence that certain required steps, parameters, and requirements for successful completion of the calibration, scan, and/or repair procedure were properly carried out. As discussed herein, such acquisition of screen captures and/or screen recordings can be carried out automatically by the report manager 210, or the report manager 210 can provide a prompt 1908 to the user. The prompt 1908 can be persistently provided on the display screen 317 such that a user can capture a screen capture or a screen recording whenever desired. Alternatively, the prompt 1908 can be displayed according to a context sensitive schedule related to the steps carried out for the current scan, calibration, and/or repair procedure (i.e., a user can be periodically provided an opportunity to perform a screen capture or screen recording during the performance of various steps or tasks of a calibration and/or repair procedure).

As described herein, the exemplary documentary steps for acquiring screen capture, screen recordings, and other images and videos are used to provide documentation of required procedural steps that may not be adequately supported in conventional scan, calibration, or repair diagnostic reports. Such documentation may be used to verify that a required procedural step was carried out, e.g., a particular vehicle OEM may require a steering angle reset as a part of a scan and the resulting OEM scan report may not explicitly state that the steering angle reset was completed. Therefore, a screenshot or screen recording visually showing the "completed" dialogue popup 1904 in the OEM application software (displayed on the display screen 317) would document the correct completion of the required task or step (FIG. 19). In another example, an exemplary ADAS calibration or repair might require the positioning of a fixture or target within, for example, two (2) degrees from center, where the OEM software will include a data list 1902 on-screen that shows how many degrees off the target or fixture is from center (FIG. 19). Capturing the listed number of degrees the target or fixture is from specification (as listed in the data list 1902) can document that the setup for the procedural step or task was completed correctly. As noted herein, in some situations, the calibration or repair procedure might not provide explicit documentation that the fixtures or targets were set up correctly according to specifications, instead the ADAS calibration or repair OEM software might only include a visual popup dialogue box 1904 (on display screen 317) that states that the step was completed successfully (not included in the saved report file). As illustrated in FIG. 19, when critical information or data is displayed on a display screen 317 of an exemplary computer device 30 or diagnostic tool 28, such information or data may be documented with the use of a screen capture, screen recording, and image or video recording or the like, and the resulting data files appended or linked as document files 108*a*, 108*b*, 108*c* to the associated scan report or calibration and/or repair diagnostic report (resulting in a final document report 1204). As illustrated in FIG. 19, an exemplary data list 1902 displays a list of data results, measurements, specified parameters (e.g., fixture off angles). With the performance of a screen capture or a screen recording or other image or video effort, the data displayed in the data list 1902 may be recorded as a related document file 108. Similarly, when a popup window 1904 displays, for example, indicating that a required test parameter or setup procedure has been completed, the screen 317 may be recorded to document the required procedural completion and saved as a further document file 108. Optionally, certain types of imagery and video recordings can be accessed by the recipient of the final document report 1204 by "clicking" on a URL link provided in the final document report 1204. The URL link could lead back to the image or video recording stored in the server 214, 212 or some other storage location. As also illustrated in FIG. 19, a prompt dialog box 1908 is also provided on the display screen 317. In an aspect of the present embodiment, the prompt dialog box 1908 can be displayed whenever a required or critical procedural step has been completed and related data/information is currently displayed on the display screen 317. A screen capture or screen recording (or other image or video recording) at this moment provides for documentation of the completed procedural step and the related data/information. Optionally, the prompt dialog box 1908 can be persistently displayed allow the user to optionally capture a screen capture or screen recording whenever desired. Additional indications at the prompt dialog box 1908 could also be used to indicate to the user that new data/information is currently displayed and should be captured. In an aspect of the present embodiment, when screen captures or screen recordings are acquired, a dialog box popup 1908 can be provided to the user to indicate that a screen capture or screen recording has been saved. This provides an indication to the user that screen captures and/or screen recordings are taking place when such recordings are automatic. The confirmation dialog box 1908 may also be used to confirm that a user initiated screen capture or screen recording has been completed.

Referring to FIG. 12, the report manager 210 (via the portal 64) is communicatively coupled to a network 70 such that a diagnostic tool 28 and/or a service provider's computer devices 30, 30*a* can be communicatively coupled to the portal 64 and the report manager 210. The data (i.e., diagnostic data 57*a*, 57*b*, 57*c* and/or calibration/repair diagnostic data 157*a*, 157*b*, 157*c*) and supporting documentation (i.e., document files 108*a*, 108*b*, 108*c*) that are used to make up a final documentation report 1204 are retrieved from their storage locations (e.g., from a local server 214 or a remote server 212). Optionally, the documents and data for a final documentation report 1204 can be stored locally in either the diagnostic tool 28 or the computer device 30 or some other computer device (e.g., computer devices 30*a*, 30*b*). As described herein, the report manager 210 is configured to access the local or remote servers 214, 212 (or other optional databases, storage areas, or servers) to acquire the selected contents (data files and documentation files) of the documentation report 1204. That is, during the performance of one or more procedures (e.g., pre- or post-checklists, scans, calibrations, repair procedures, or other services provided by the service provider), related documentary data, imagery, and videos are also captured and recorded during the steps or tasks of the procedures, and saved in a desired electronic format, and also stored in one or more of the servers 212, 214 (or other optional databases, storage areas, or servers) and made available for the report manager 210 to selectively prepare the documentation report 1204. In one embodiment, the captured and stored documents are stored in multiple storage locations (e.g., both servers 212, 214).

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A method of performing a service procedure on a vehicle comprising:
   providing a vehicle interface computer device, said vehicle interface computer device configured to be connected to a diagnostic port of a vehicle to be in communication with an electrical system of the vehicle and operate in a mode to communicate with the vehicle;
   connecting said vehicle interface computer device with the diagnostic port of the vehicle to be in communication with the electrical system of the vehicle;
   running a vehicle service application program comprising a calibration and/or a repair application program via the vehicle interface computer device, wherein the calibration and/or repair application program comprises a plurality of procedural steps for carrying out a calibration and/or repair procedure;
   capturing with the vehicle interface computer device screen capture data comprising screen captures and/or screen recordings of a display screen of the vehicle interface computer device while completing the procedural steps of the vehicle service application program, wherein the screen capture data records data and/or information results displayed on the display screen while running the vehicle service application program during the service procedure, wherein the screen capture data comprises selected images of data and/or information results displayed on the display screen during the procedural steps, and wherein the screen captures are either automatically selected and captured or manually selected and captured; and
   outputting and saving the screen capture data.

2. The method of claim 1, wherein said running the vehicle service application program further comprises generating a data log file from the electrical system of the vehicle, and wherein said outputting and saving the screen capture data further comprises outputting and saving the data log file.

3. The method of claim 2, wherein the screen capture data includes at least a portion of data and/or information that is not contained in the data log file.

4. The method of claim 2, wherein the data log file is generated in a native file format defined by the vehicle service application program.

5. The method of claim 4, further comprising using a diagnostic evaluation tool program to extract a particular predefined selected portion of calibration and/or repair diagnostic data from the data log file, wherein the diagnostic evaluation tool program is operable to extract calibration and/or repair diagnostic data from the data log files regardless of native file format; and
   outputting and saving the particular predefined selected portion of calibration and/or repair diagnostic data to a database, wherein the particular predefined selected portion of calibration and/or repair diagnostic data is retained in the database in a common format independent of the native file format of the data log file.

6. The method of claim 5, further comprising generating a calibration and/or repair diagnostic detail report from the extracted particular predefined selected portion of calibration and/or repair diagnostic data using the database.

7. The method of claim 5, further comprising transmitting the extracted particular predefined selected portion of calibration and/or repair diagnostic data to a remote computer.

8. The method of claim 1, wherein said providing a vehicle interface computer device further comprises providing a computer, and wherein said computer includes a plurality of vehicle service application programs.

9. The method of claim 8, wherein said computer is located proximate to the vehicle.

10. The method of claim 1 further comprising selecting one of a plurality of vehicle service application programs, wherein the selected vehicle service application program is selected based at least in part on the make and model of the vehicle and the calibration and/or repair procedure to be performed, and wherein the resulting data log file is generated in one of a plurality of possible native file formats depending on the selected vehicle service application program.

11. The method of claim 10, wherein the plurality of native file formats comprises text in portable document format ("PDF"), PDF images, and Hypertext Markup Language ("HTML").

12. The method of claim 5, wherein said using a diagnostic evaluation tool program to extract the particular predefined selected portions of calibration and/or repair diagnostic data from the data log file comprise translating the native file format of the data log file and parsing the data log file, wherein said translating the native file format comprises translating the native file format to HTML, and wherein the common format in which the extracted particular predefined selected portion of calibration and/or repair diagnostic data is saved is HTML.

13. The method of claim 1, wherein the screen capture data comprises procedural data displayed on the display screen related to the service procedure, and wherein the screen capture data provides documentation regarding completion of the service procedure.

14. The method of claim 13 further comprising capturing with a camera or video camera images or video recordings of the display screen and/or of the performance of the service procedure.

15. The method of claim 2 wherein said method further comprises generating a calibration and/or repair diagnostic detail report from the screen capture data and the data log file, including extracting screen capture data related to at least selected ones of the procedural steps for documenting performance of the selected ones of the procedural steps.

16. A system for performing service procedures on a vehicle comprising:
   a vehicle interface computer device configured to connect to a diagnostic port of a vehicle to be in communication with an electrical system of the vehicle and operate in a mode to communicate with the electrical system of the vehicle, wherein said vehicle interface computer device comprises a display screen;
   a vehicle service application program configured for operation with the vehicle interface computer device, wherein the vehicle service application program comprises a calibration and/or a repair application program, wherein the calibration and/or repair application program comprises a plurality of procedural steps for carrying out a calibration and/or repair procedure;
   wherein with the vehicle interface computer device is configured to capture screen capture data comprising screen captures and/or screen recordings of the display screen of the vehicle interface computer device while completing the procedural steps of the vehicle service application program, wherein the screen capture data records data and/or information results displayed on the display screen while running the vehicle service application program during the service procedure, wherein the screen capture data comprises selected images of data and/or information results displayed on the display screen during the procedural steps, and wherein the screen captures are either automatically selected and captured or manually selected and captured.

17. The system of claim 16, wherein the system is configured to generate a data log file based on vehicle service application program, and wherein the data log file comprises data from the electrical system of the vehicle, and wherein the screen capture data includes at least a portion of data and/or information that is not contained in the data log file.

18. The system of claim, 17, wherein the data log file is generated in a native file format defined by the vehicle service application program.

19. The system of claim 18, further comprising a diagnostic evaluation tool program configured to extract a particular predefined selected portion of calibration and/or repair diagnostic data from the data log file, wherein the diagnostic evaluation tool program is operable to extract calibration and/or repair diagnostic data from the data log files regardless of native file format.

20. The system of claim 17, wherein the system is configured to generate a calibration and/or repair diagnostic detail report from the screen capture data and the data log file, wherein the detail report includes screen capture data related to at least selected ones of the procedural steps for documenting performance of the selected ones of the procedural steps.

* * * * *